United States Patent [19]
Ino

[11] Patent Number: 5,923,488
[45] Date of Patent: Jul. 13, 1999

[54] RECORDING AND REPRODUCING DEVICE AND A RECORDING AND REPRODUCING HEAD WITH A DETECTION ELEMENT FOR DETECTING HEAD OFF-TRACK

[75] Inventor: Tsuneyori Ino, Kawasaki, Japan

[73] Assignee: Fujitsu Limited, Kawasaki, Japan

[21] Appl. No.: 08/922,420

[22] Filed: Sep. 3, 1997

Related U.S. Application Data

[63] Continuation of application No. 08/541,306, Oct. 10, 1995, abandoned.

[30]    Foreign Application Priority Data

Nov. 8, 1994  [JP]  Japan ................................ 6-274074

[51] Int. Cl.$^6$ .................................................. G11B 19/04
[52] U.S. Cl. .......................... 360/60; 360/77.06; 360/121
[58] Field of Search .................... 360/60, 77.06, 360/77.07, 77.08, 77.11, 77.12, 103, 113, 121

[56]    References Cited

U.S. PATENT DOCUMENTS

| | | | |
|---|---|---|---|
| 3,769,464 | 10/1973 | Jinsenji et al. | 360/77.12 |
| 4,485,418 | 11/1984 | Bremmer | 360/77.06 |
| 5,040,083 | 8/1991 | Matsumoto et al. | 360/77.06 X |
| 5,121,280 | 6/1992 | King | 360/73.03 X |
| 5,452,152 | 9/1995 | Rudi | 360/77.12 |
| 5,568,331 | 10/1996 | Akagi et al. | 360/77.07 |

FOREIGN PATENT DOCUMENTS

| | | | |
|---|---|---|---|
| 194 641 | 9/1986 | European Pat. Off. | 360/77.06 |
| 1-229454 | 9/1989 | Japan . | |
| 2-302915 | 12/1990 | Japan | 360/77.11 |
| 3-219414 | 9/1991 | Japan | 360/77.11 |
| 4-109421 | 4/1992 | Japan | 360/77.06 |
| 5-101520 | 4/1993 | Japan . | |

OTHER PUBLICATIONS

D. R. McEfee, "Read/Write Servo Magnetic Head," IBM TDB vol. 20, No. 9, Feb. 1978, pp. 3673–3674.

*Primary Examiner*—Aristotelis M. Psitos
*Assistant Examiner*—James L Habermehl
*Attorney, Agent, or Firm*—Greer, Burns & Crain Ltd.

[57]    ABSTRACT

A magnetic head for a recording and reproducing device includes an inductive head for recording use having an upper magnetic pole and an upper magnetic shield layer, an MR element of an MR head element for reproducing use and an MR detection head element for detecting an off-tracking. The MR detection head element and the inductive head are approximately aligned so that the MR detection head element is positioned over an adjacent track gap when the inductive head is positioned over a track. The MR detection head element detects positioning errors due to impact and vibration.

13 Claims, 20 Drawing Sheets

FIG. 1A PRIOR ART
FIG. 1B PRIOR ART
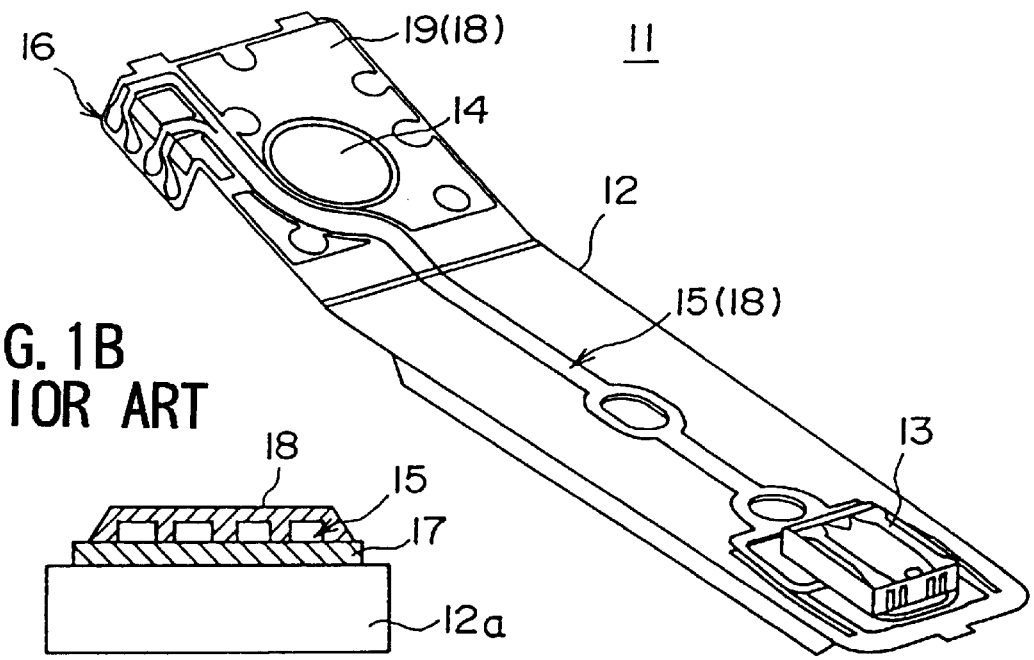
FIG. 2 PRIOR ART
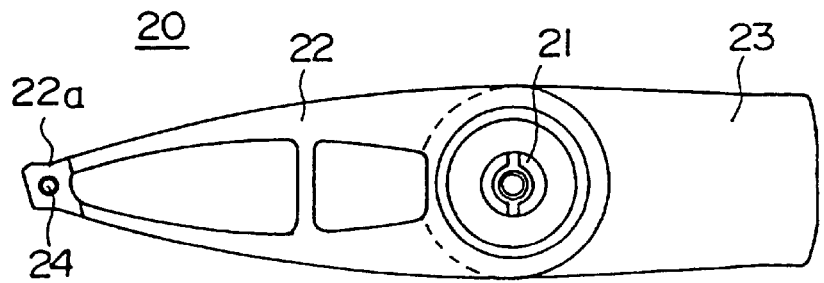

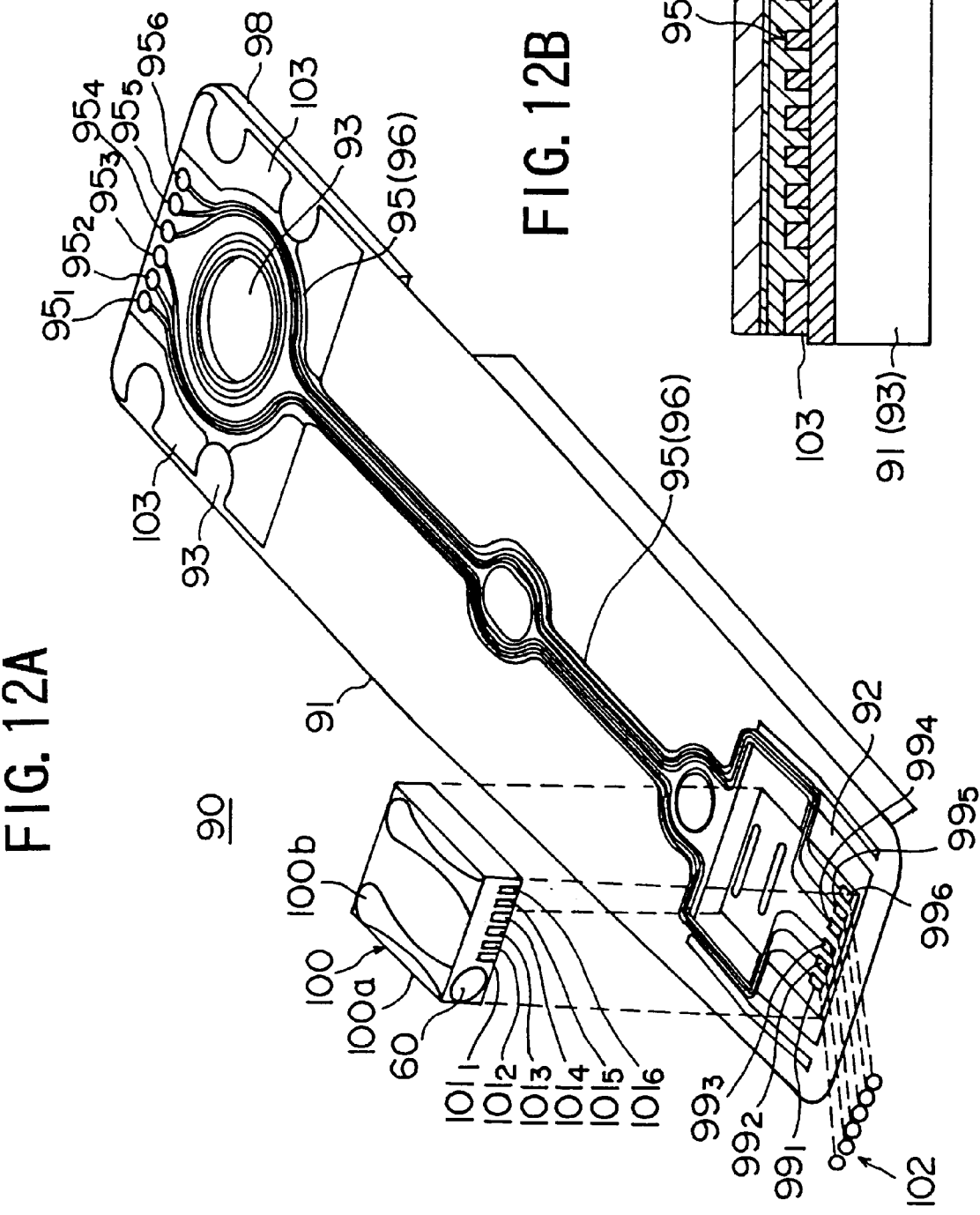
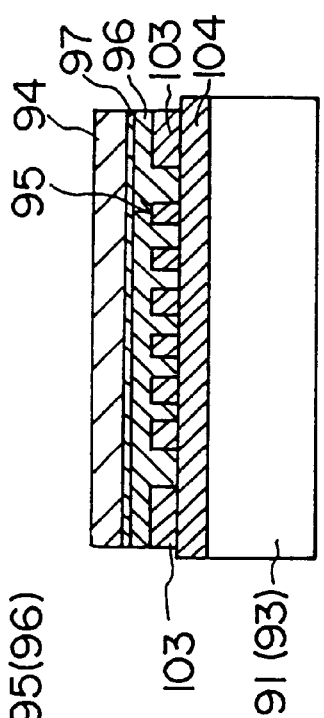
FIG. 12A
FIG. 12B

RECORDING AND REPRODUCING DEVICE AND A RECORDING AND REPRODUCING HEAD WITH A DETECTION ELEMENT FOR DETECTING HEAD OFF-TRACK

This application is a continuation of application Ser. No. 08/541,306 filed on Oct. 10, 1995 now abandoned.

BACKGROUND OF THE INVENTION

1. Field of the Invention

The present invention generally relates to a recording and reproducing device and a recording and reproducing head used therein, more particularly to a recording and reproducing device in which a positioning error of a recording and reproducing head due to vibration and impact is detected accurately and the recording and reproducing head used therein.

2. Description of the Prior Art

Currently, along with a high integration and a miniaturization of a magnetic disc as a recording and reproducing device, a magnetic head assembly having a magnetic head which records and reproduces data has been miniaturized. Because of the miniaturization, the device is very susceptible to vibration or impact. An off-tracking, wherein a magnetic head for recording or reproducing is moved off a track in which data is recorded, occurs easily due to the vibration and impact. Therefore, an off-tracking correction is indispensable in the magnetic head assembly. However, the off-tracking does not always occur when the vibration occurs. Therefore, an accurate detection of the off-tracking is desired.

In the magnetic disc device, magnetic heads are arranged facing one or both surfaces of the magnetic disc. The magnetic head is mounted at one end of a suspension which is fixed at one end of a carriage arm of an actuator. By driving the actuator, the magnetic head moves in a radial direction of the magnetic disc.

FIGS. 1A and 1B are schematic illustrations showing a magnetic head assembly of a conventional magnetic disc device. In FIG. 1A, the magnetic head assembly has a suspension which is a metal plate such as stainless steel bent at a certain angle. At a front end of the suspension 12, a magnetic head 13, in which a thin-layer head is provided on a slider, is mounted through an adhesive. At a back end of the suspension 12, a fixing hole 14 is formed. In this case, the magnetic head 13 is a composite thin-layer magnetic head comprising a thin-layer magnetic head for recording and a magnetoresistance effect (MR) head for reproduction.

In the suspension 12, a signal pattern 15 for transmitting four signals for recording and reproduction to the magnetic head 13 is formed. A front end thereof is connected to terminals of the magnetic head 13 and a back end thereof is formed as lead terminals 16 provided on a side of the suspension 12.

In the signal pattern 15, as shown in FIG. 1B, an insulating layer 17 is formed on the baseboard 12a of the suspension. On the insulating layer 17, four signal patterns 15 are made, for example, by etching copper. On the signal patterns 15, an insulating protective layer 18 having a thickness of several microns is formed. At the back end of the suspension 12 except where the fixing hole 14 and the signal pattern 15 are formed, a dummy pattern 19 of metal is formed in order to maintain an equal thickness of the protective layer 18. That is, the protective layer 18 is formed on the whole surface of the signal pattern 15. The magnetic head suspension assembly 11 is fixed on the actuator.

FIG. 2 is a plan view showing the actuator.

In FIG. 2, the actuator 20 comprises a plurality of carriage arms 22 rotated about a rotation axis 21 and a voice coil motor (VCM) 23 having a voice coil (not shown) as a driving means. In the front end portion 22a of carriage arm 22 in which an installation hole 24 is formed, the above-mentioned magnetic head assembly 11 is provided.

FIGS. 3A and 3B are schematic illustrations showing the conventional composite thin-layer magnetic head in which FIG. 3A is a partial perspective view and FIG. 3B is a sectional view. FIG. 4 is a partial perspective view showing a conventional magnetic head slider.

FIGS. 3A and 3B show the composite thin-layer magnetic head 13 in which an electromagnetic conversion head (recording head) and magnetoresistance effect (MR) head (reproducing head) are combined. In FIGS. 3A and 3B, the magnetoresistance effect head (MR head) comprises a non-magnetic baseboard 32, a magnetoresistance effect element (MR element) 33 of a rectangular shape formed on the non-magnetic baseboard 32, conductive lead layers 34a (34b) provided at both ends of the MR element 33, an upper magnetic shield layer 35a and a lower magnetic shield layer 35b.

The conductive lead layers 34a, 34b are cut off at a certain width in the longitudinal direction of the MR element 33 and are connected to both ends of an MR layer of the MR element 33. The MR element 33 and the conductive lead layers 34a, 34b are formed between the upper magnetic shield layer 35a and the lower magnetic shield layer 35b and are electrically insulated by non-magnetic insulating layers 36.

In the electromagnetic conversion head (inductive head) 37 for recording data onto the magnetic disc 30, a recording gap 38 including alumina ($Al_2O_3$) is formed on the upper magnetic shield layer 35a of the MR head 31 also serving as a lower magnetic pole (first magnetic pole). On the recording gap 38, an inner insulating layer 39, a conductive thin-layer coil (Cu) 40 and an upper magnetic pole 41 are formed sequentially. A horizontal recording of the data is conducted by the recording gap 38 formed between the upper magnetic pole (second magnetic electrode) 41 and the lower magnetic pole (upper magnetic shield layer) 35a. A protective insulating layer 42 is formed on the upper magnetic pole 41.

In the magnetic head slider 42, as shown in FIG. 4, two rail faces 42a, 42b are formed on the magnetic disc 30. Each head element is provided on a backside of one of rail faces 42a.

FIGS. 5A and 5B are schematic illustrations showing the magnetic disc 30. In FIGS. 5A and 5B, plural data portions 43 are formed on concentric circles of the magnetic disc 30. Between the data portions 43, track gaps 44 which are not used for storing user data are formed. A prescribed number of servo frames 45 are provided in a radius direction at a certain angle. The user's data is recorded in the data portions 43 of each track $43_1$, $43_2$.

In the magnetic disc device of the data surface servo type shown in FIGS. 5A and 5B, since the servo data is recorded in servo frames 45 between the data portions 43, no controls are available between the servo datum.

Therefore, the servo signal cannot be read to position the magnetic head 13 on-track during a read or write operation and the off-tracking correction is difficult to do.

That is, when the off-tracking occurs during the read operation, the data is misread or a read error occurs. When the off-tracking occurs during the write operation, the data recorded on the adjacent track may possibly be destroyed and cannot be recovered especially in a high-density magnetic disc.

Japanese Laid-Open Patent Application No. 1-229454 discloses a plurality of disturbance detectors provided in a frame, a base, a carriage (actuator 20), a magnetic head and so on in order to detect a disturbance to stop the read/write operations.

FIG. 6 is a circuit diagram showing a method for detecting the off-tracking. In FIG. 6, a detected signal from an impact sensor 52 as a disturbance sensor is input to a comparator 51 through an amplifier 53. In the comparator 51, the signal is compared with a determined level from a level slice circuit 54. When the disturbance is detected, the signal is input to a latch circuit 55. An output signal of the latch circuit 55 is transmitted to a digital signal processor (DSP) 56 and a read/write controller 57. The read/write controller 57 makes a write gate signal become an off state to stop supplying data to the head 13 during a write operation. Also, the read/write controller 57 makes a read gate signal become off state to stop a read operation during the read operation. In FIG. 6, the signal from the read/write controller is amplified by an amplifier 58.

FIGS. 7A and 7B are a schematic illustrations showing the off-tracking in the conventional magnetic head. In FIG. 7A, when the disturbance and the vibration are not detected by the impact sensor 52, the MR head 31 and the inductive head (electromagnetic conversion head) 37 are on a prescribed track 43 (43₂).

When the magnetic head 13 is off the track, a positioning error by which the MR head 31 and the inductive head 37 cross over the track gaps 44 adjacent to the track 43 (43₂) leads to the read error, as shown in FIG. 7B. When the impact sensor detects the disturbance, the read operation stops and a tracking operation is conducted so as to reposition the magnetic head on the track.

The Japanese Laid-Open Patent Application No. 5-101520 discloses a method for detecting a disturbance in which the disturbance is detected by a magnetic head which does not perform a read/write operation.

However, in the method disclosed in Japanese Laid-Open Patent Application No. 1-229454, only a certain level of the impact can be detected by the impact sensor 52. Also, even when head core center (core of the MR head 31 and inductive head 37) is on the center of a track, that is, a relative position therebetween is not changed, the disturbance may be detected and the read/write operation stops, which deteriorates the performance of the device.

Besides the impact, when the center of the head core does not correspond to that of the track due to a disturbance of a VMC control current, the disturbance cannot be detected and read/write operation is continuously conducted. In this case, the data recorded on the track is destroyed or misread.

In the method disclosed in the Japanese Laid-Open Patent Application No. 5-101520, the off-tracking is detected by another magnetic head continuously reading the signal during read/write operation.

However, there may be a situation in which the magnetic head which performs read/write operation is off the track and the another magnetic head is on the track, due to a specific vibration. In this case, the read/write operation is continued.

On the contrary, when the magnetic head which performs the read/write operation is on the track and the magnetic head detecting the off-tracking is off the track, the read/write operation stops.

The present invention is developed in order to solve the problems described above.

SUMMARY OF THE INVENTION

Accordingly, it is a general object of the present invention to provide a novel and useful recording and reproducing device in which a positioning error of a recording and reproducing head due to vibration and impact is detected accurately and the recording and reproducing head used therein.

The above object of the present invention is achieved by a recording and reproducing device having a recording and reproducing head which records and reproduces data on a recording medium in which a plurality of tracks are arranged between track gaps are not used for storing used data therefore; the recording and reproducing head comprising a recording head element recording data on the tracks of the recording medium, a reproducing head element reproducing data recorded on the tracks of the recording media, and a detection head element for detecting a positioning error of the recording and reproducing head by reproducing data stored in a certain area on the recording medium which is offset. from that in which the reproducing head is positioned. In the above invention, the detection head element can be a magnetoresistance effect type or an electromagnetic conversion type. The positioning error of the recording and reproducing head can be detected by the detected reproducing signal. Thus, the positioning error of the recording and reproducing head can be detected accurately.

In the above invention, the detection head element can be arranged so as to be positioned over one of the track gaps when the recording head element and the reproducing head element are positioned over one of the tracks. In the above invention, the detection head element and the recording head element can be approximately on the same line in a track-arrangement direction. In the above invention, the detection head element can be on one of the tracks when the recording head element and the reproducing head element are on another of the tracks. In the above invention, the detection head element and the recording head element can be approximately on the same line in a track-arrangement direction. According to the above invention, the positioning error of the recording and reproducing head due to the vibration and the impact can be detected accurately, and the read/write operation can be stopped in response to the detection of the tracking error.

In the above invention, the record head element can record data only when the detection head element can reproduce the data. According to the present invention, the data is prevented from being destroyed if the off-tracking occurs during the recording operation.

The above invention can further have off-tracking detecting means for detecting a positioning error in response to a variation of a reproduction output signal from the detection head element. The positioning error of the recording and reproducing head due to the vibration and the impact can be detected accurately.

In the above invention, the off-tracking detecting means can have level slice means for storing a prescribed slice level. The level slice means compares the prescribed slice level with the production output signal from the detection head element in order to detect the off-tracking of each of the recording head element and the reproducing head element. In the above invention, the level slice means renews the prescribed slice level during a calibration. In the above invention, the level slice means stores the prescribed slice level for each of the heads. In the above invention, the level slice means can store the prescribed slice level for each of the zones in the recording medium. According to the above invention, the positioning error of the recording and reproducing head can be detected accurately.

The above object of the present invention is also achieved by a recording and reproducing head for recording and reproducing data on a recording medium comprising a slider rail, a recording head element for recording data on a track of the recording medium, a reproducing head element for reproducing data recorded on a track of the recording medium, and a detection head element for detecting a positioning error of each of the recording head element and the reproducing head element, the head element for detection use being provided adjacent to one of the recording head element and the reproducing head element, wherein the recording head element, the reproducing head element and the detection head element are provided on the slider rail. In the above invention, the detection head element and the recording head element can be approximately on the same line so that detection head element is positioned over a different area of the recording medium from that in which the recording head element is positioned. According to the above invention, the positioning error of the recording and reproducing head due to the vibration or the impact can be detected accurately by the output signal from the head element for detection use.

Other objects and further features of the present invention will be apparent from the following detailed description when read in conjunction with the accompanying drawings.

BRIEF DESCRIPTION OF THE DRAWINGS

FIG. 1A is a perspective view showing a magnetic head assembly of a conventional magnetic disc device;

FIG. 1B is a sectional view showing the magnetic head assembly of the conventional magnetic disc device;

FIG. 2 is a plan view showing an actuator assembly of the conventional magnetic disc device;

FIG. 12A is a perspective view showing the magnetic head assembly shown in FIGS. 11A and 11B;

FIG. 12B is a sectional view showing a fixing portion of a suspension;

DESCRIPTION OF THE PREFERRED EMBODIMENTS

The preferred embodiments of the present invention will now be described in further detail with reference to the accompanying drawings.

Figure 8A:
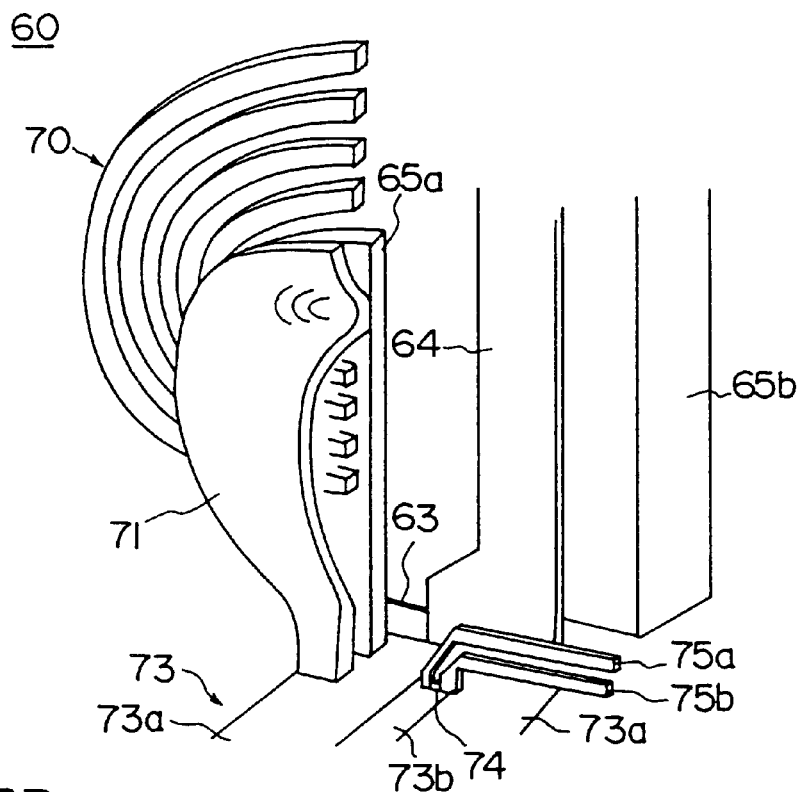
FIG. 8A is a partial perspective view showing a magnetic head mounted in a magnetic disc device of a first embodiment of the present invention.
Figure 8B:
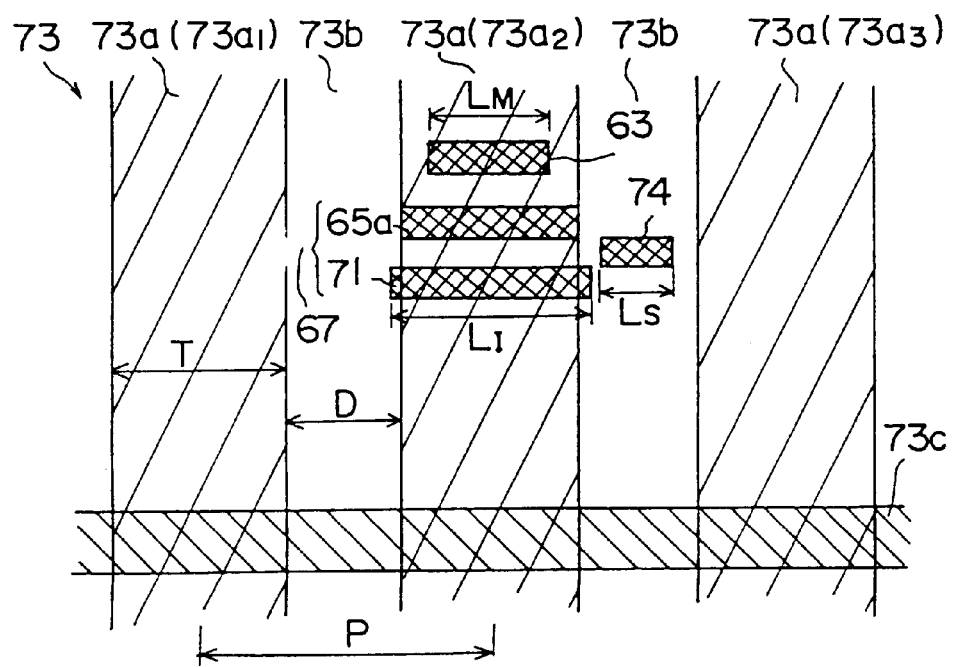
FIG. 8B is a schematic illustration showing positions of each head element in tracks in the first embodiment of the present invention.

FIGS. 8A and 8B are schematic illustrations showing a first embodiment of the present invention in which FIG. 8A is a partial perspective view showing a magnetic head mounted in a magnetic disc device as a recording and reproducing device and FIG. 8B is a schematic illustration showing positions of each head element in tracks.

Figure 9A:
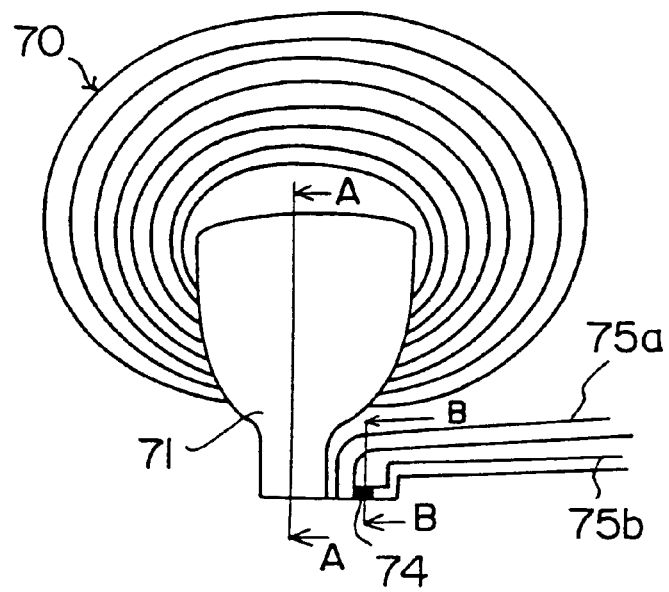
FIG. 9A is a front view showing an internal structure of the magnetic head shown in FIGS. 8A and 8B.
Figure 9B:
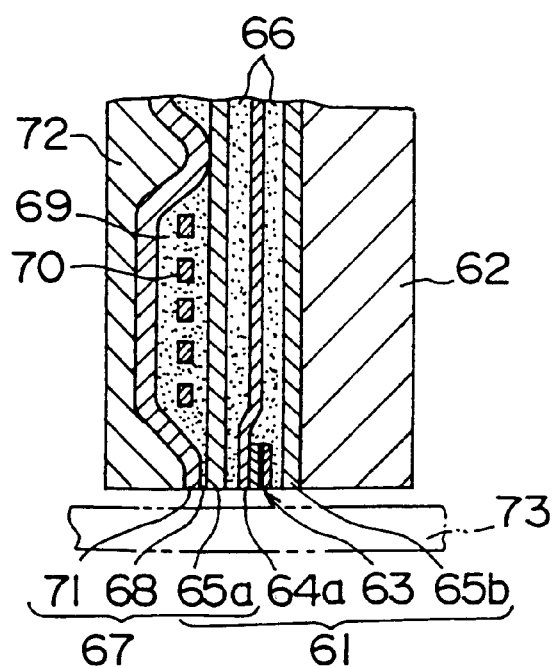
FIG. 9B is a sectional view taken along a line A—A of FIG. 9A.
Figure 9C:
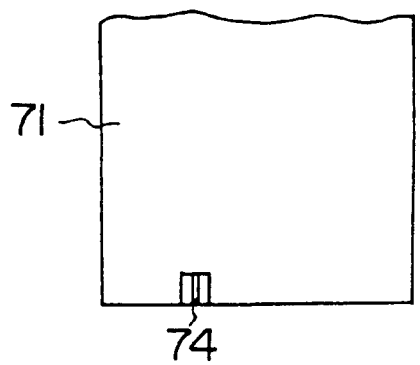
FIG. 9C is a sectional view taken along a line B—B of FIG. 9A.

FIGS. 9A, 9B and 9C are schematic illustrations showing an internal structure of the magnetic head shown in FIGS. 8A and 8B in which FIG. 9A is a front view, FIG. 9B is a sectional view taken along a line A—A of FIG. 9A and FIG. 9C is a sectional view taken along a line B—B of FIG. 9A.

A magnetic head 60 shown in FIGS. 8A, 9A, 9B and 9C is a composite thin-layer magnetic head in which an electromagnetic conversion head (recording head) and a magnetoresistance effect (MR) head (reproducing head) are incorporated. In the drawings, the magnetoresistance effect (MR) head element 61 comprises a magnetic resistance effect element (MR element) 63 of a rectangular shape, which is formed on a non-magnetic baseboard 62, conductive lead layers 64a, 64b of the MR element 63, an upper magnetic shield layer 65a and a lower magnetic shield layer 65b.

The conductive lead layers 64a, 64b are cut off in a longitudinal direction of the MR element 63 and are connected to both ends of the MR layer of the MR element 63. The MR element 63 and the conductive lead layers 64a, 64b, which are electrically insulated by a non-magnetic insulating layer 66, are provided between the upper magnetic shield layer 65a and the lower magnetic shield layer 65b.

On the other hand, in the electromagnetic conversion head (inductive head) 67 for recording data onto the magnetic disc (described later), a recording gap 68 including alumina ($Al_2O_3$) is formed on the upper magnetic shield layer 65a of the MR element 61 also serving as a lower magnetic pole (first magnetic pole). On the recording gap 68, an inner insulating layer 69 of thermosetting resin, a conductive thin-layer coil (Cu) 70 and an upper magnetic pole 71 are formed sequentially. Horizontal recording of the data is conducted by the recording gap 68 formed between the upper magnetic pole (second magnetic electrode) 71 and the lower magnetic pole (upper magnetic shield layer) 65a. A protective insulating layer 72 is formed on the upper magnetic pole 71.

In the MR element 63, a soft magnetic material layer to be a liner bias layer is formed of a SAL (Soft Adjacent Layer) of NiFeCr of 300 Å in thickness. An MR layer of NiFe of 300 Å is formed on the soft magnetic material layer with a non-magnetic intermediate layer (i.e., tantalum, 100 Å in thickness) therebetween. On the MR layer, each conductive lead layer 64a is made by forming a tungsten (W) layer on an iron/manganese (FeMn) layer with a tantalum (Ta) layer therebetween. The other conductive lead layer 64a, in which a W layer is formed on a FeMn layer through a Ta layer, are formed.

The MR head element 61 utilizes a phenomenon in which a resistance of the MR layer 33c depends on a relative angle θ between a direction of a magnetization changing in response to a signal magnetic field and a direction of a sensor current flowing in the MR layer.

Figure 5A:
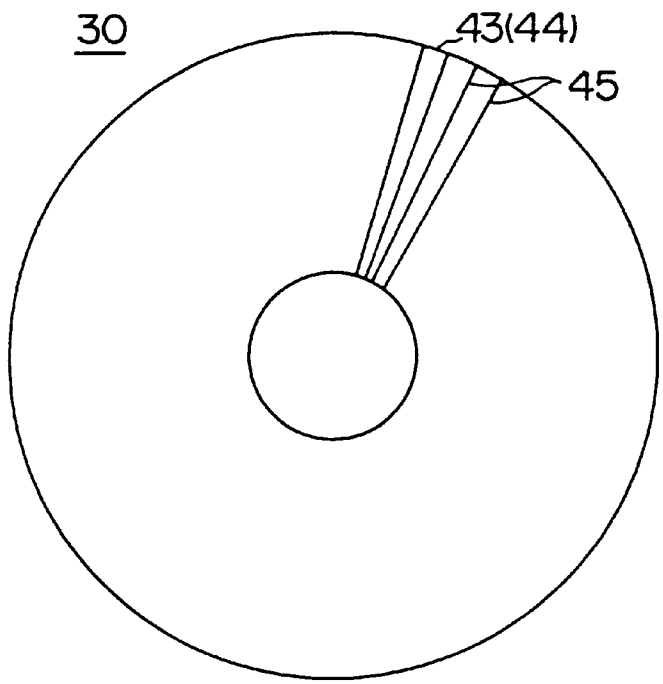
FIG. 5A is a plan view showing a conventional magnetic disc.
Figure 5B:
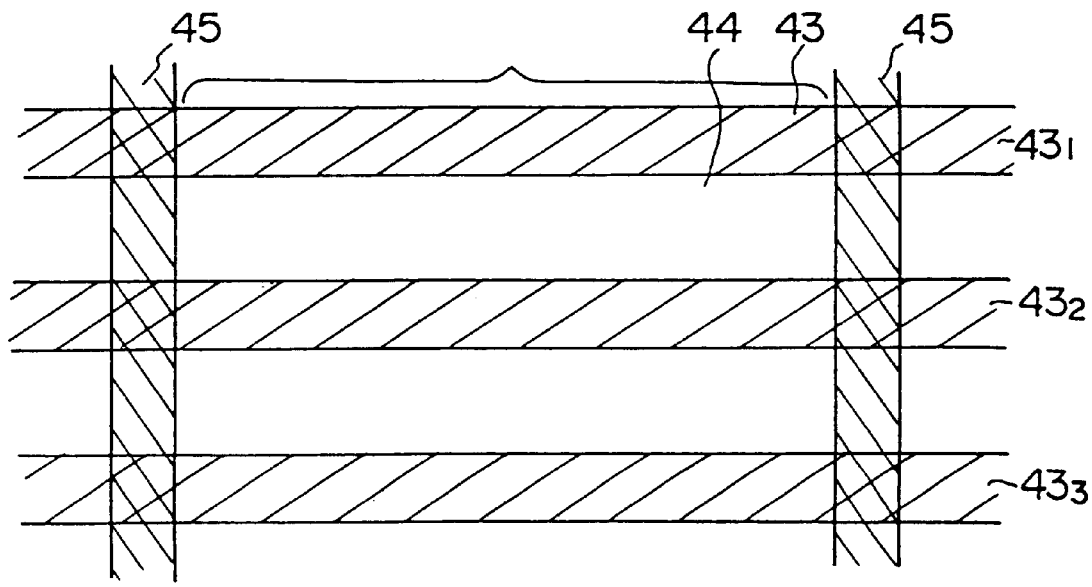
FIG. 5B is a schematic illustration showing a data portion of the magnetic disc.
Figure 6:
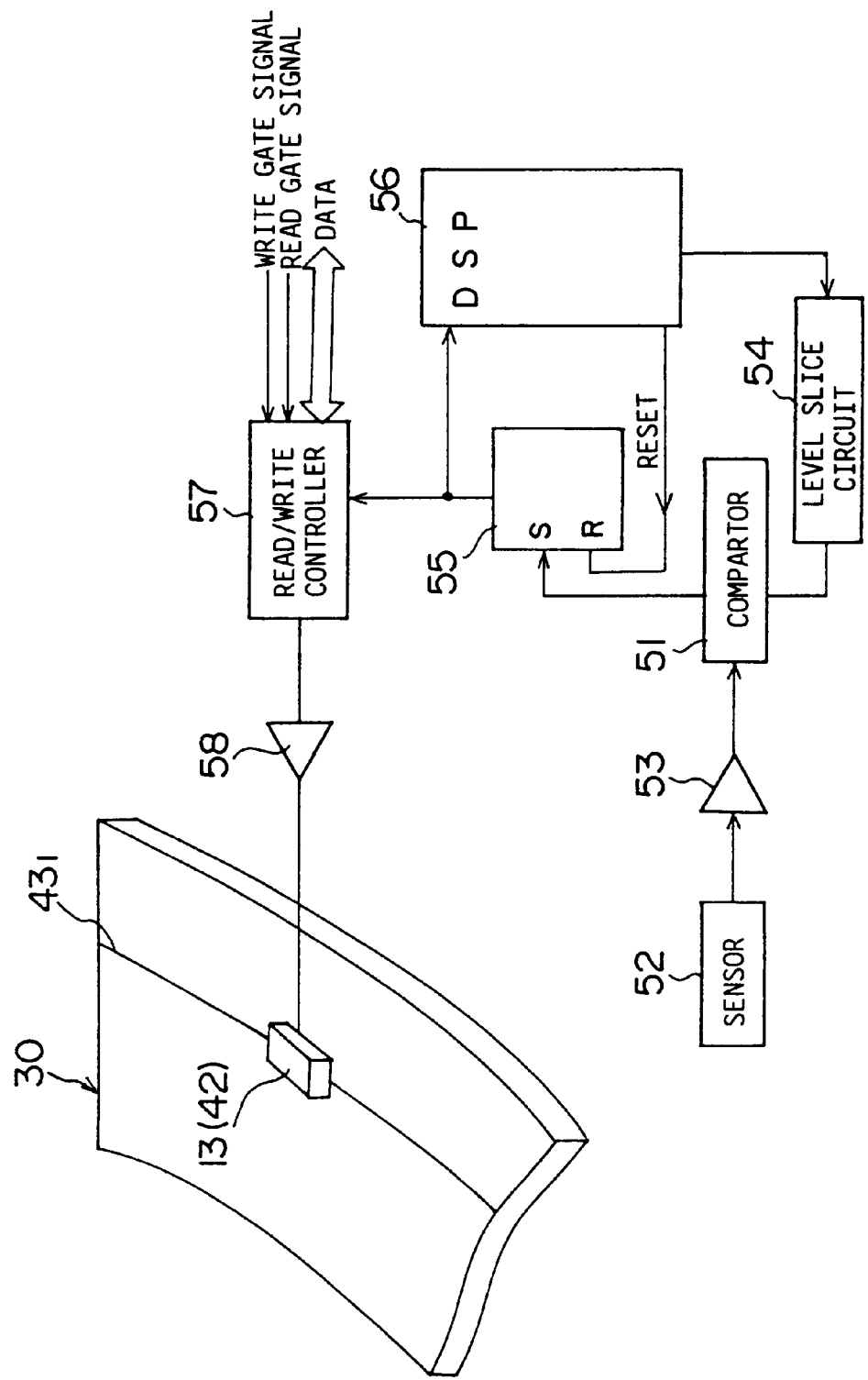
FIG. 6 is a circuit diagram showing a conventional off-tracking detecting circuit.
Figure 7A:
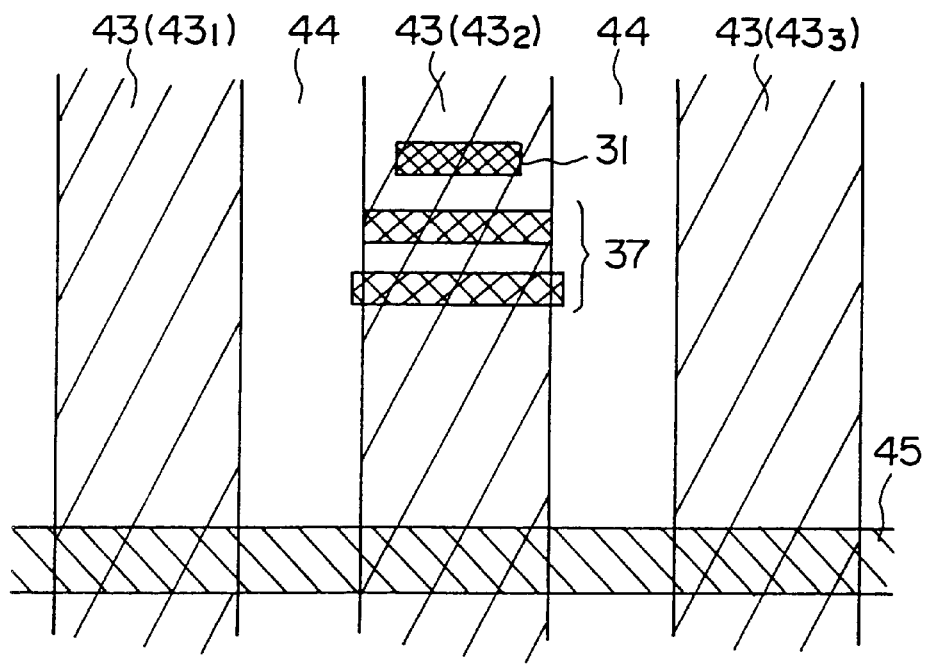
FIGS. 7A and 7B are schematic illustrations showing positions of each head element in tracks in the conventional magnetic disc.
Figure 7B:
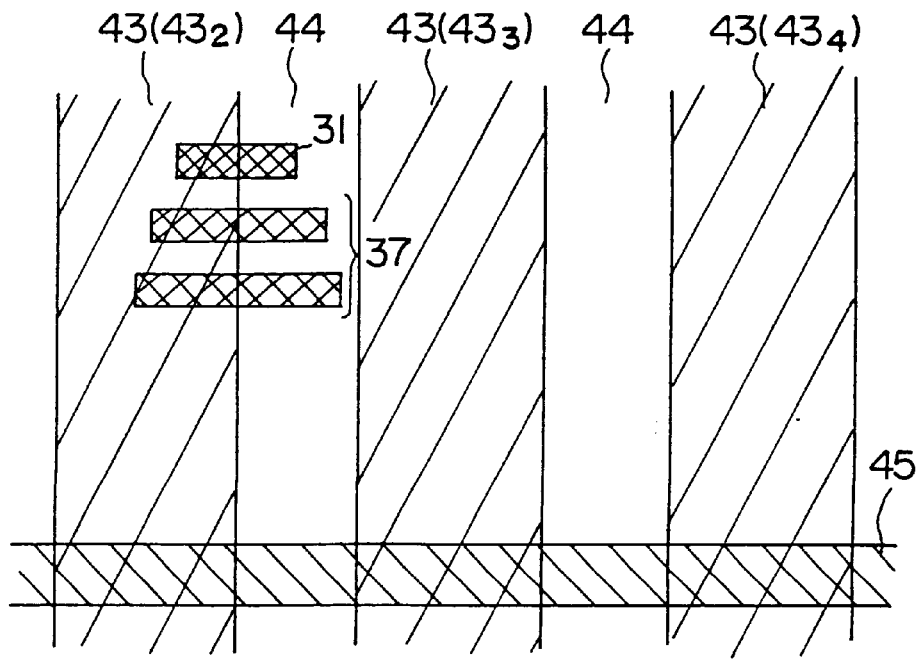

In a magnetic disc 73 serving as a recording medium, a certain number of tracks 73a in which data is recorded is formed on concentric circles, like the magnetic disc shown in FIG. 5A. Between the tracks 73a in a radial direction, gaps 73b which are not used for storing user data therefor are formed. Also, a certain number of servo frames 73c in which servo data is recorded are formed at a certain angle in the radial direction, as shown in FIG. 8B.

When the inductive head 67 and the MR head element 61 are positioned on the track 73a of the magnetic disc 73, an MR head for detection use 74 is positioned over the track gap 73b adjacent to the track 73a in a manner that a distance from the actuator to the inductive head 67 is approximately equal to that to a distance from the actuator to the MR head for detection use 74. The MR head for detection use has conductive lead layers 75a, 75b provided at both sides. The MR head for detection use 74 is covered with the protective insulating layer 72 as well.

Figure 3A:
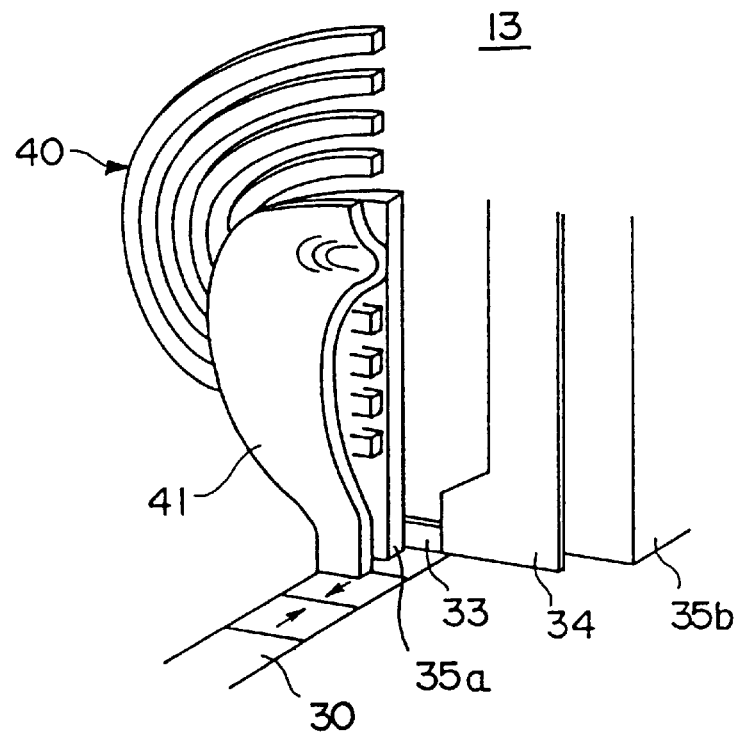
FIG. 3A is a partial perspective view showing a conventional composite thin-layer magnetic head.
Figure 3B:
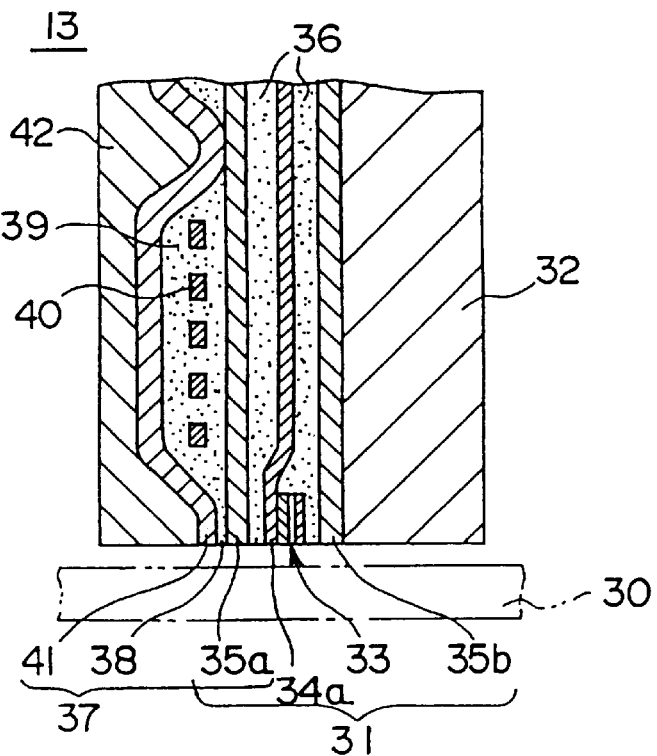
FIG. 3B is a sectional view showing the conventional composite thin-layer magnetic head
Figure 4:
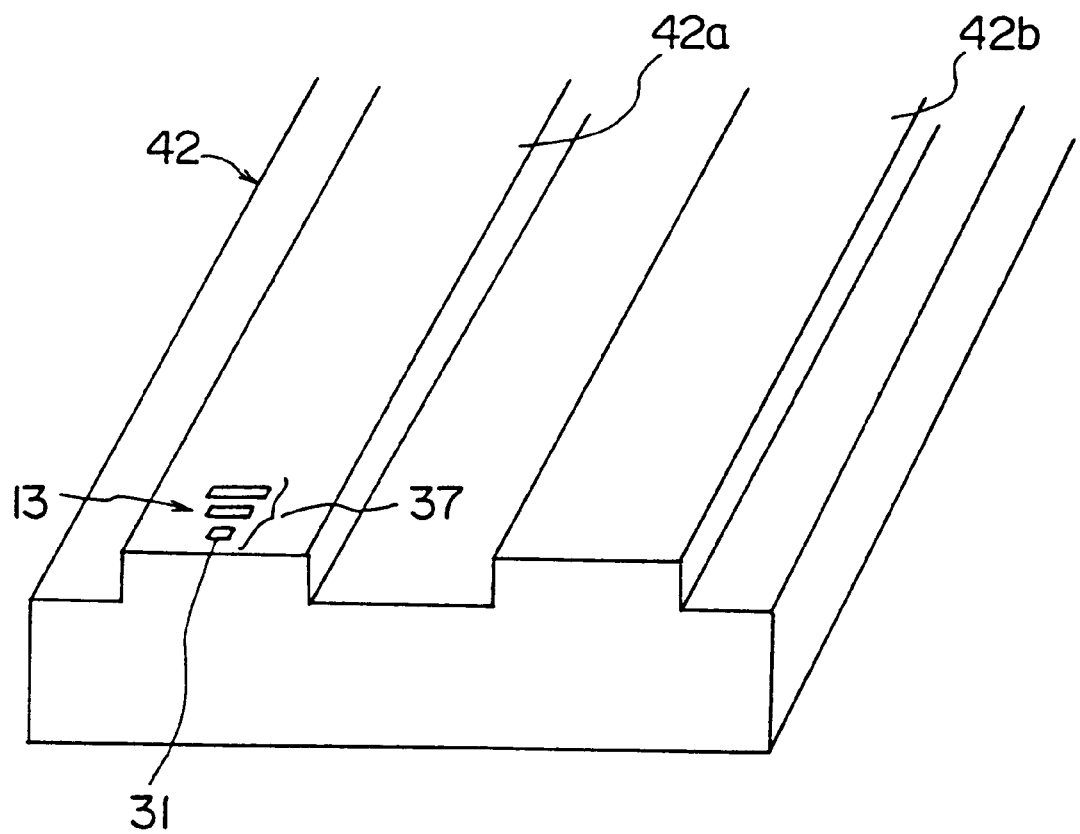
FIG. 4 is a partial perspective view showing a conventional magnetic head slider.

The MR head element 61, the inductive head 67 and the MR element for detection use 74 are provided in the magnetic head slider in the way as described in FIG. 4 (Cf. FIG. 12). In this case, terminals for electrical connection are provided at the back end of the magnetic head (Cf. FIG. 12).

In FIG. 8B, T represents a width of the track 73a (i.e., 2 µm), D represents a width of the track gap 73b (i.e., 0.5 µm) and P represents a track pitch (i.e., 2.5 µm). The MR head element for detection use 74 is arranged a distance P/2 from a center of the inductive head 67 (center of the track) and at a distance almost the same as that from the rotational center of the actuator in which the magnetic head 60 is mounted. That is, the MR head element for detection use 74 and the inductive head 67 are on almost on aligned in a radial direction.

It is not necessary for the MR head element for detection use 74 to be positioned in the track gap 73b adjacent to the track 73a in which the inductive head 67 (MR element 63) is positioned. The MR head element for detection use 74 can be arranged in another track gap 73b if the size thereof allows it. For example, the MR head element for detection use 74 can be arranged on the slider rail which is different from hat on which the inductive head 67 (MR element 63) is formed. However, for an accurate arrangement, it is preferred that they are arranged close in the same slider rail. In this case, the MR element for detection use 74 is arranged at a position a distance nP/2 (n:integral number) from the center of the inductive head 67.

In FIG. 8B, $L_M$ represents a width of the core of the MR element 63 (for example, 1.5 µm), $L_I$ represents a width of the core of the upper magnetic pole 71 of the inductive head 67 (for example, 2.4 µm) and $I_S$ represents a width of the core of the MR head for detection use 74 (for example, 1.2 µm).

Figure 10:
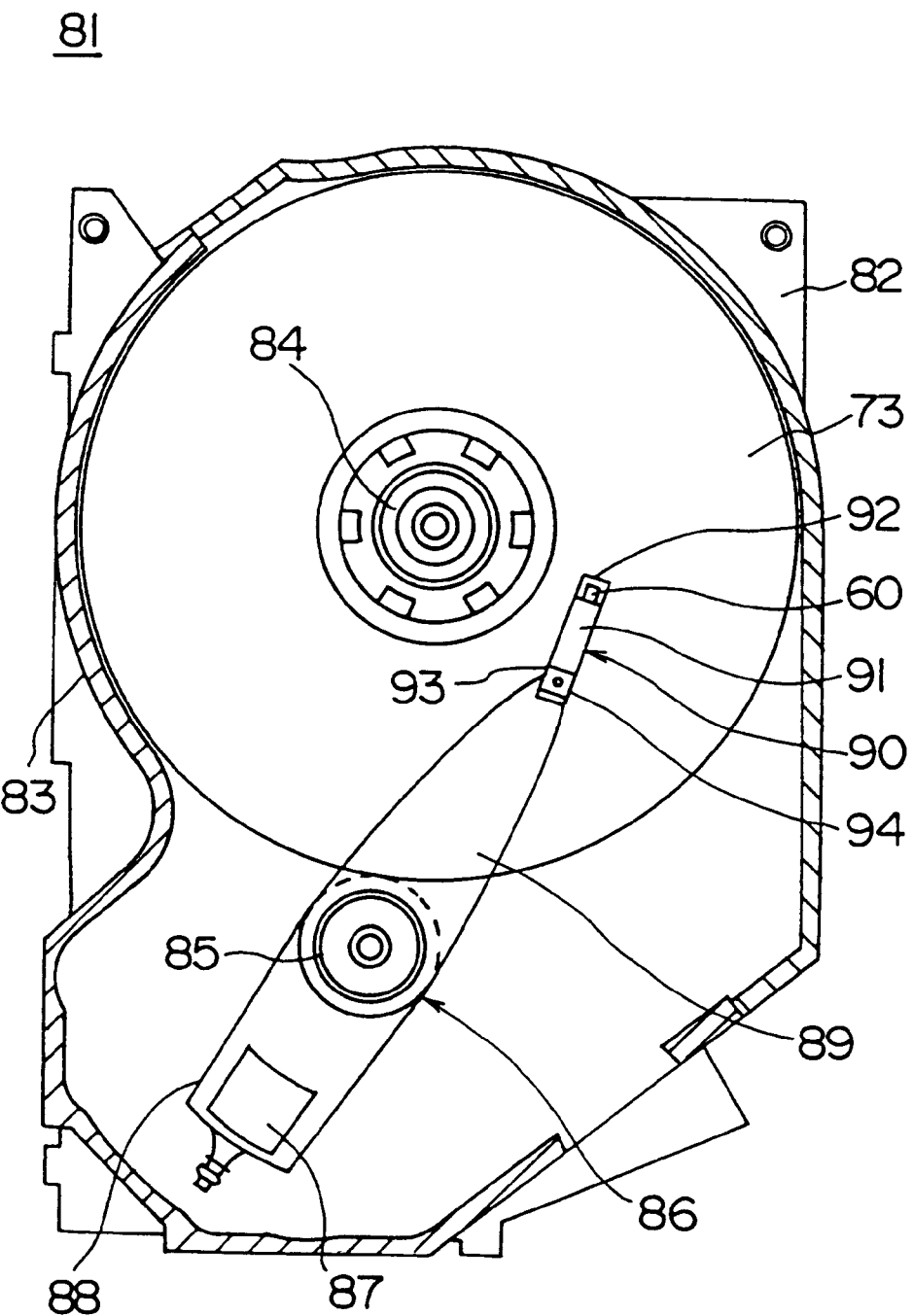
FIG. 10 is a plan view showing the magnetic disc device in which the magnetic head shown in FIG. 8A is mounted.

FIG. 10 is a plan view showing a magnetic disc device in which the magnetic head shown in FIG. 8A is mounted. The magnetic disc device 81 shown in FIG.10 is provided with a cover 82 and a base 83, in which a prescribed number of magnetic discs 73 serving as recording media are arranged at a prescribed interval in a spindle mechanism 84.

In addition, an actuator assembly 86 rotatable about a rotational axis 85 is provided adjacent to the magnetic disc 73. One side of the actuator assembly 86 from the rotational axis 85 constitutes a driving portion 88 in which a voice coil 87 which constitutes a voice coil motor is provided. The other side thereof constitutes a carriage arm 89 as a head carrying member arranged on one or both sides of the magnetic disc, corresponding to the number of the magnetic discs.

At one side of each carriage arm, the magnetic head assemblies 90 are provided, as will be described later. At a head mounting portion 92 at a front end of the suspension 91, which is a head supporting member of the magnetic head assembly 90, the magnetic head 60 is mounted. At a fixing portion 93 of the carriage arm 89, a protective cover 94 is provided, as will be described later.

Figures 11A, 11B:
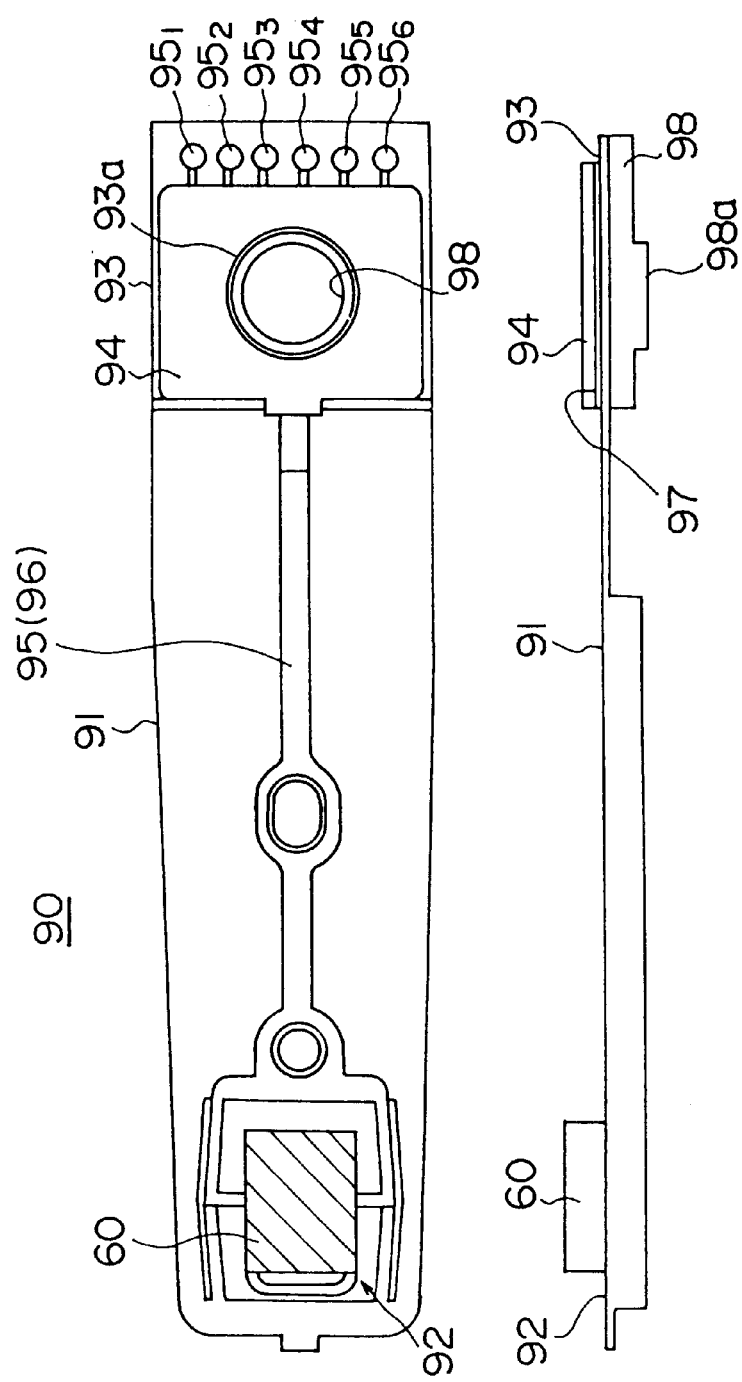
FIG. 11A is a plan view showing a magnetic head assembly shown in FIG. 10.
FIG. 11B is a side view showing the magnetic head assembly shown in FIG. 10.

FIGS. 11A and 11B are schematic illustrations showing a magnetic head assembly shown in FIG. 10, in which FIG. 11A is a plan view and FIG. 11B is a side view.

In the magnetic head assembly 90 shown in FIGS. 11A and 11B, a head mounting portion 92 is formed at a front end and a fixing portion 93 is formed at a back end. A fixing hole 93a is formed in the fixing portion 93. A signal pattern 95 for transmitting six signals for record/regeneration and detecting off-tracking is formed on the suspension 91. An insulating layer 96 is formed on the signal pattern 95 (described later referring to FIG. 12).

At one end of the signal pattern 95 extending to the head mounting portion 92, six terminals are formed, and the magnetic head 60 is mounted through an adhesive, as will be described later. The signal pattern 95 extends to the fixing portion 93 avoiding the fixing hole 93a. At the extending end thereof, six terminals $95_1$–$95_6$ are formed for an outer connection. The insulating layer 96 is not formed on the terminals $95_1$–$95_6$.

On the signal pattern 95 (insulating layer 96) of the fixing portion 93, a protective cover 94 made of metal (i.e., stainless steel, 50 µm in thickness) or resin (i.e., polyimide resin, polyurethane resin, phenol resin or acrylic resin, 50 µm in thickness) is provided using an adhesive 97.

On the back face of the fixing portion 93 of the suspension 91, a spacer 98 of a certain thickness is fixed by a spot welding using a laser ray. The spacer 98 is incorporated with a cylindrical engage portion 98a to be engaged with a fixing hole in the carriage arm 89, in which a frame is formed therein.

FIGS. 12A and 12B are schematic illustrations showing the magnetic head assembly shown in FIGS. 11A and 11B, in which FIG. 12A is a perspective view and FIG. 12B is a sectional view showing a fixing portion of the suspension. As shown in FIG. 12A, at the front end of the head mounting portion 92 in the suspension 91, terminals $99_1$–$99_6$ extending from the signal pattern 95 are formed without an insulating layer.

On the other hand, the magnetic head 60 is formed on the back end face of one slider rail 100b of a slider portion 100a of a magnetic head slider 100. The face thereof adjacent to terminals $101_1$–$101_6$ is formed in an L shape. When the magnetic head slider 100 is mounted, the terminals $101_1$–$101_6$ are electrically connected to the terminals $99_1$–$99_6$ of the head mounting portion 92 through bump electrodes 102 made of golden balls.

On the fixing portion 93 of the suspension 91, which is adjacent to the signal pattern 95, a dummy pattern 103 is formed as a supplemental pattern. A protective layer 96 is formed on the dummy pattern 103, as shown in FIG. 12B. In FIG. 12B, on the suspension 91 made of, for example, stainless steel, an insulating layer 104 of polyimide is formed by a spin coating method (i.e., 3 µm thick). On the insulating layer 104, the signal pattern 95 and the dummy pattern 103 of Cu (i.e., 4 µm thick) are formed by, for example, a plating, a sputtering or an etching. On the signal pattern 95 and the dummy pattern 103 except the terminals $95_1$–$95_6$, an insulating layer 96 (i.e., polyimide, several microns thick) is formed by a spin coating method. Other portions of the suspension 91 are treated in the same way.

The protective layer 96 of the fixing portion 93 is covered with a protective cover 94 (i.e., several microns thick) of, for example, stainless steel using an adhesive. By forming a dummy pattern 103 in the fixing portion 93, flatness of the protective layer 96 is obtained. By this feature, flatness of the protective cover 94 is realized and an accuracy in height (i.e., 10 µm) is maintained as well.

Since the spacer 98, the suspension 91 (fixing portion 93) and the protective cover 94 are made of the same material, stainless steel (SUS material), thermal expansion coefficients thereof are the same. Therefore, a strain occurring due to a difference in heat deformation can be avoided.

In the above-mentioned magnetic head assembly 90, the terminals $95_1$–$95_6$ for outer connection are formed on the same face as that on which the protective cover 94 is provided. However, the terminals $95_1$–$95_6$ can be provided at a side of the protective cover 94.

Figure 13:
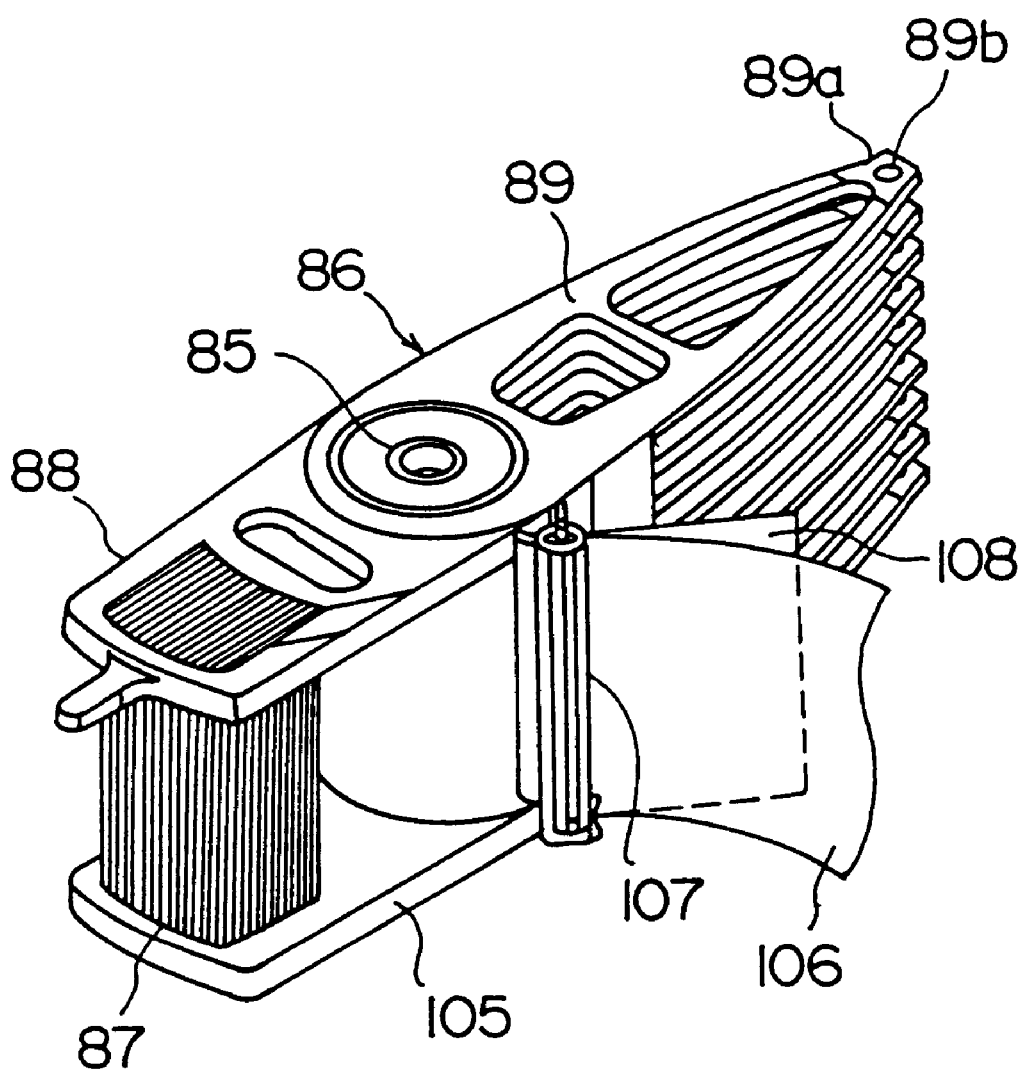
FIG. 13 is a perspective view showing an actuator assembly.

FIG. 13 is a perspective view showing an actuator assembly. In the actuator assembly 86 shown in FIG. 13, a prescribed number of carriage arms 89 are provided at a prescribed pitch on one side of the rotation axis 85. A driving portion 88 in which the voice coil 87 is provided on a coil supporting plate 105 is provided on the other side. A flexible printed-circuit board (FPC) 106 for transmitting and receiving signals to and from the voice coil 87 and the magnetic head 60 is supported by a fixing portion 107. In FIG. 13, the reference numeral 108 refers to a press board.

At the front end of each carriage arm 89, a fixing portion 89a, in which a fixing hole 89 is formed, is provided. The above-mentioned magnetic head assembly 90 is provided on one or both surfaces of the fixing portion 89a.

Figure 14:
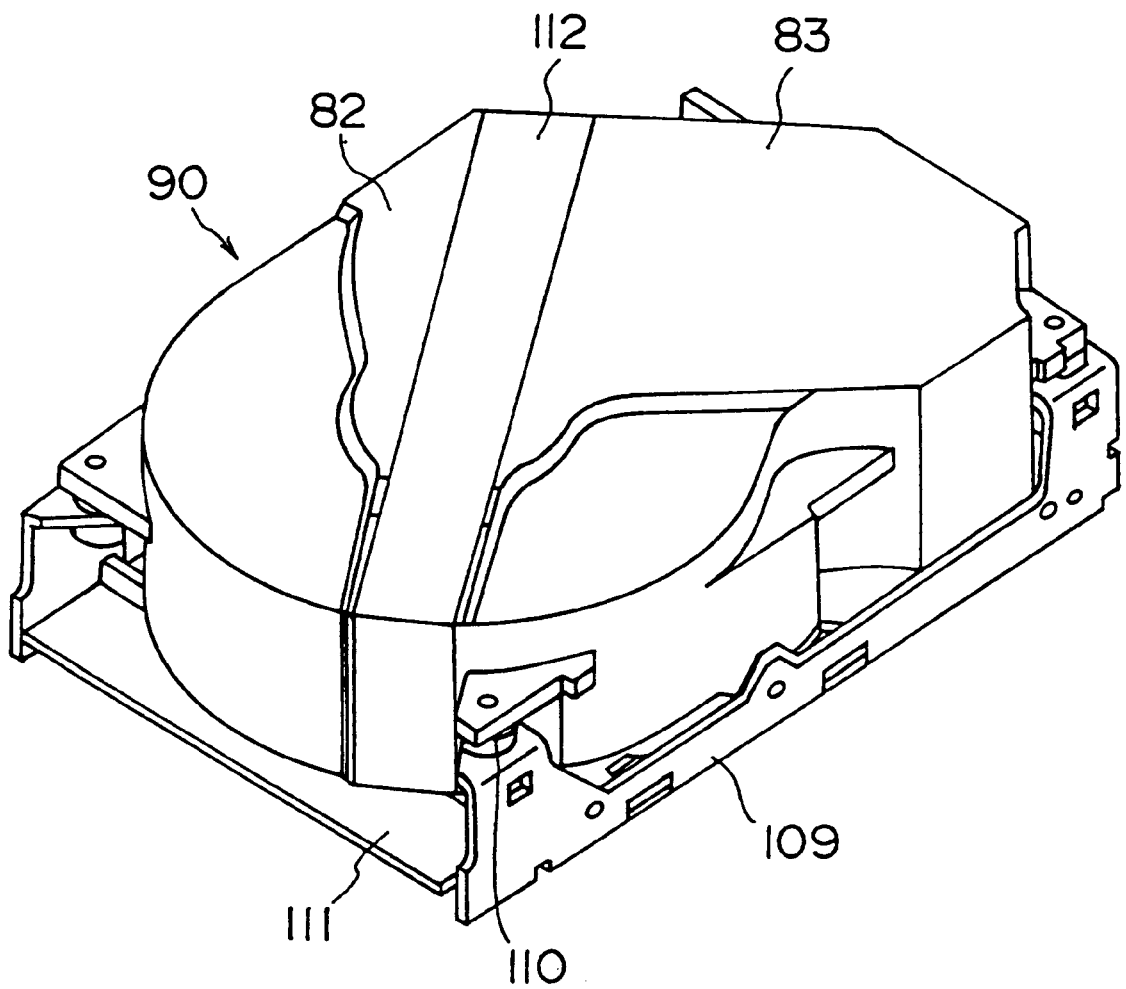
FIG. 14 is a perspective view showing the magnetic disc.
Figure 15:
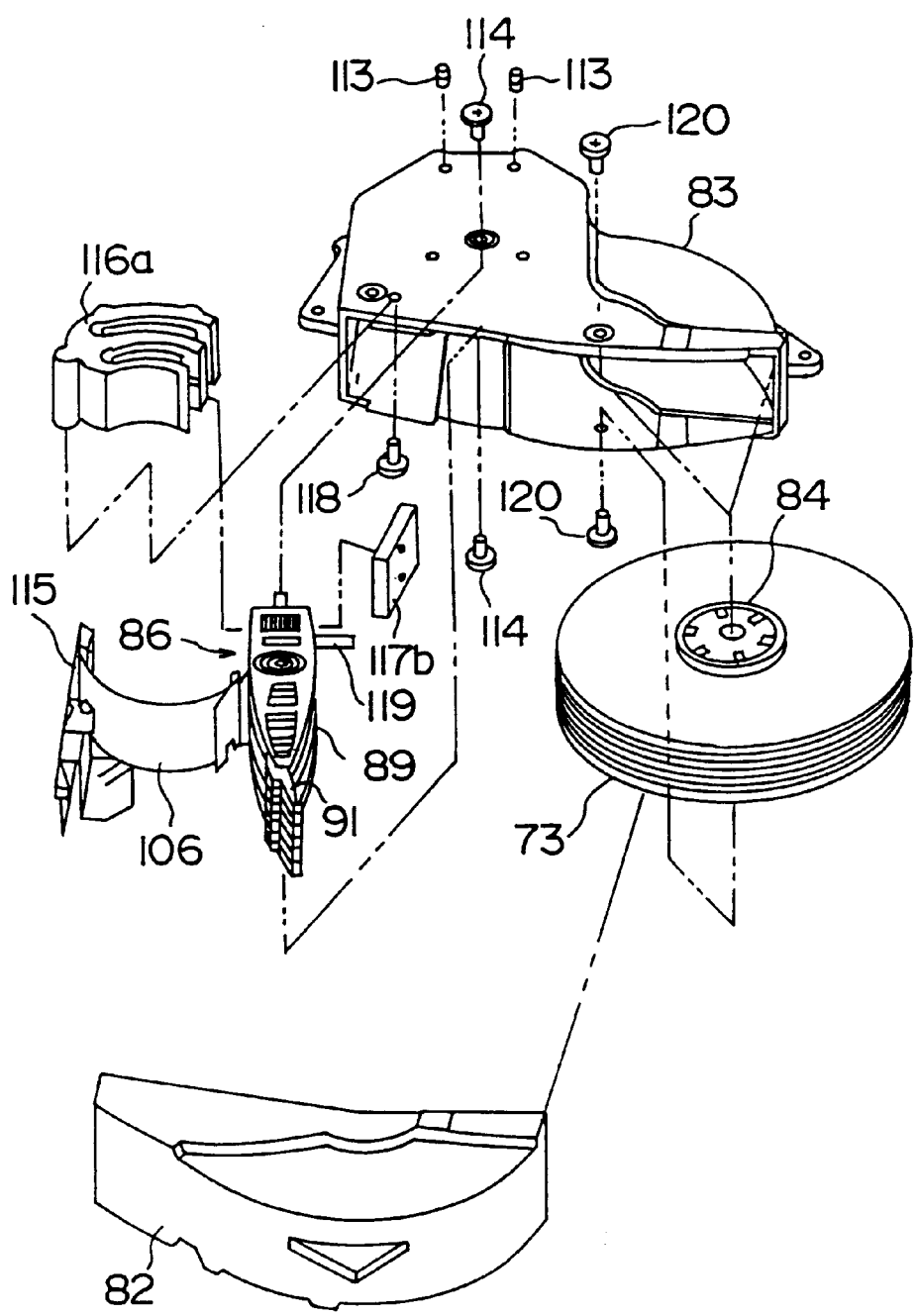
FIG. 15 is a exploded view showing the magnetic disc.

FIG. 14 is a perspective view showing a magnetic disc device and FIG. 15 is a construction view showing the magnetic disc device. In the magnetic disc device 81, the magnetic disc 73 and the actuator assembly 86 are installed in an enclosure having the cover 82 and the base 83. The enclosure is fixed to a fixing tool 109 through a vibration preventing gum 110. In the fixing tool 109, a printed-circuit board 111 in which a control circuit and an outer connection connector are provided. The cover 82 overlaps the base at a divided portion and the overlapped portion is sealed by an adhesive tape 112 to keep the inside airtight.

In FIG. 15, an actuator stopper 113 is inserted into the base 83. The actuator assembly 86 is fixed in the base 83 by a screw 114. A cable fixing plate 115, a yoke 116a and a side yoke 117b are fixed in the base 83 by a screw 118. The yoke 116a is inserted into the voice coil 87 of the actuator assembly 86. In FIG. 15, an actuator lock mechanism 119 is provided on the actuator assembly 86.

The spindle mechanism 84 in which a plurality of magnetic discs are provided is fixed by a screw 120 in the base 83. These mechanisms are covered with a cover 82 and sealed by an adhesive tape 112, as shown in FIG. 14.

Figure 16:
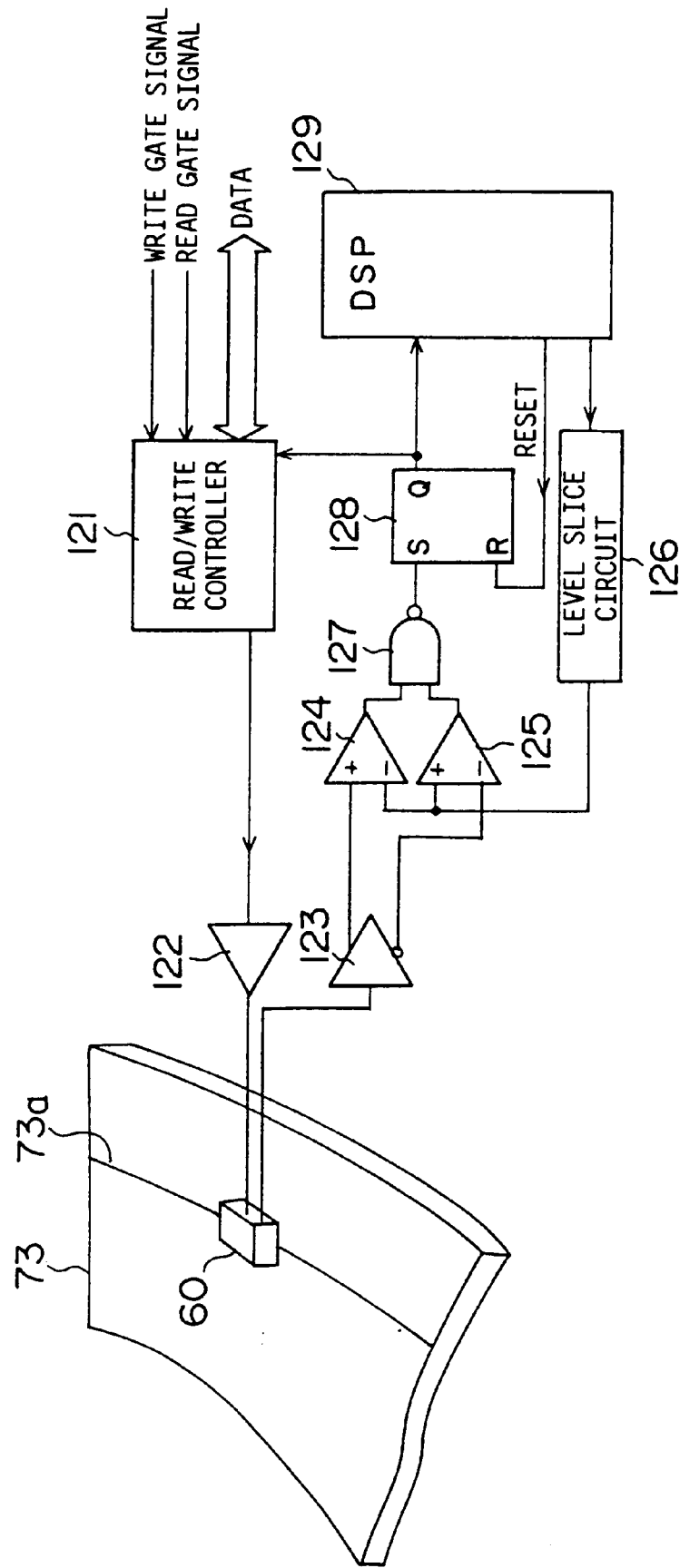
FIG. 16 is a circuit diagram showing an off-tracking detection circuit.

FIG. 16 is a circuit diagram showing an off-tracking detection circuit. In FIG. 16, a read/write controller 121 controls a read/write operation to the magnetic head 60 on the track 73a of the magnetic disc 73 through an amplifier 122 according to a write gate signal, a read gate signal and data input thereto.

The reproduction output signal from the MR head element for detection use 74 of the magnetic head 60 is input to an amplifier 123. A non-inverted output signal from the amplifier 123 is input to the non-inverted input terminal of a comparator 124, and an inverted output signal from the amplifier 123 is input to the inverted input terminal of a comparator 125. A standard signal from a level slice circuit 126 is input to the inverted input terminal of the amplifier 124 and the non-inverted input terminal of the amplifier 125.

Output signals from the comparators 124, 125 are input to a NAND gate circuit 127 and an output signal from the NAND gate circuit 127 is input to a set terminal of a latch circuit 128. An output signal from the latch circuit 128 (off-tracking signal) is transmitted to the read/write controller 121 and a DSP 129. The DSP 129 transmits a reset signal to the latch circuit 128. Also, the DSP 129 transmits a digital signal as a standard signal to the level slice circuit 126.

The amplifier 123, the comparators 124, 125, the level slice circuit 126, the NAND gate circuit 127 and the latch circuit 128 constitute an off-tracking detection circuit. Other features of the magnetic disc device 81 are the same as those of the prior art and the descriptions thereof are omitted.

Figure 17:
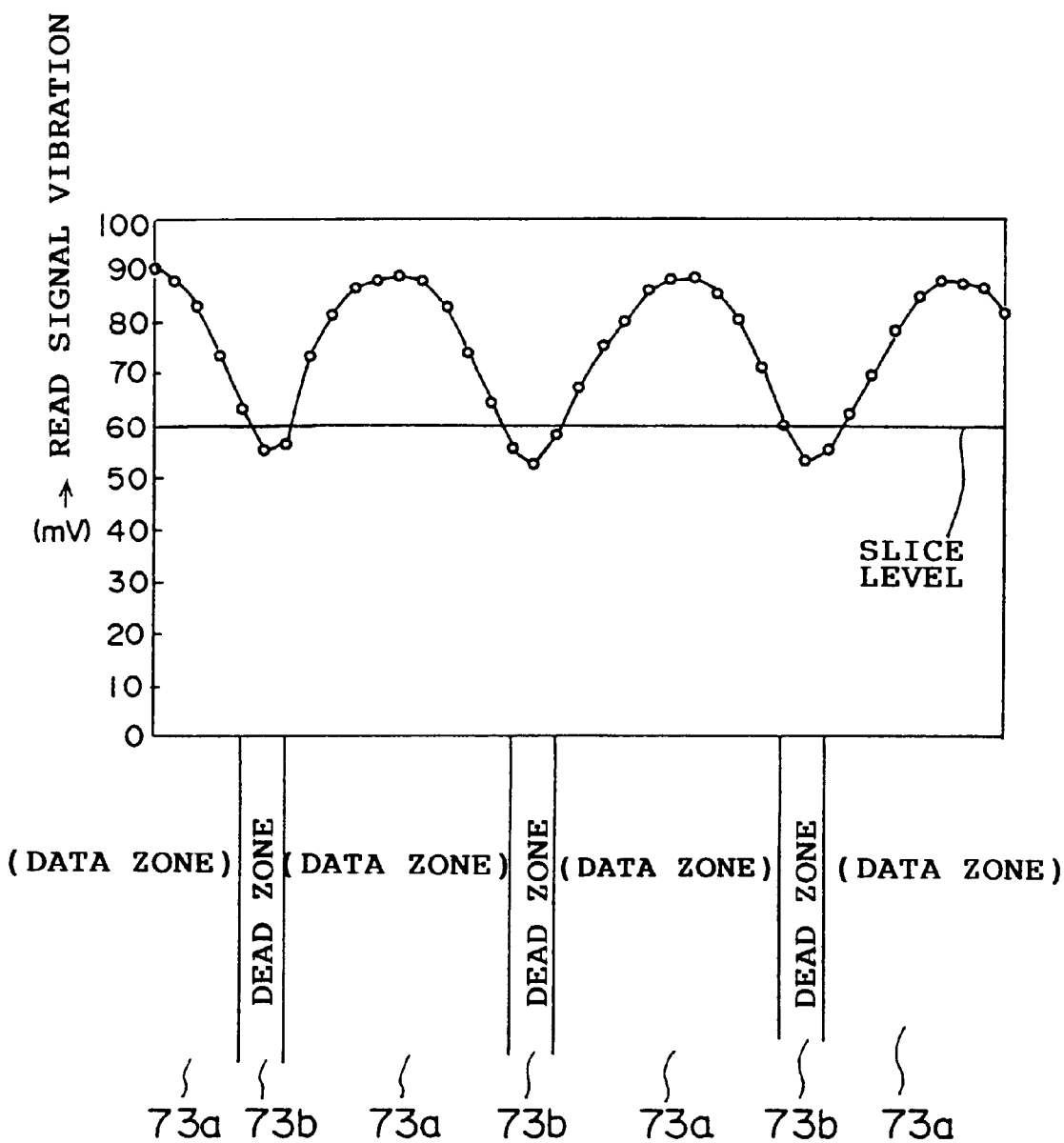
FIG. 17 is a graph showing offset amount-read vibration characteristics.

FIG. 17 is a graph showing offset amount-read vibration characteristics. In FIG. 17, a read vibration of the MR head element for detection use 74 becomes maximum on the track (DATA ZONE) 73a responding to the off-tracking of the magnetic head 62 and becomes minimum in the dead zone 73b. Therefore, based on the output value, an extent of the off-tracking of the magnetic head 60 can be detected.

Figure 18A:
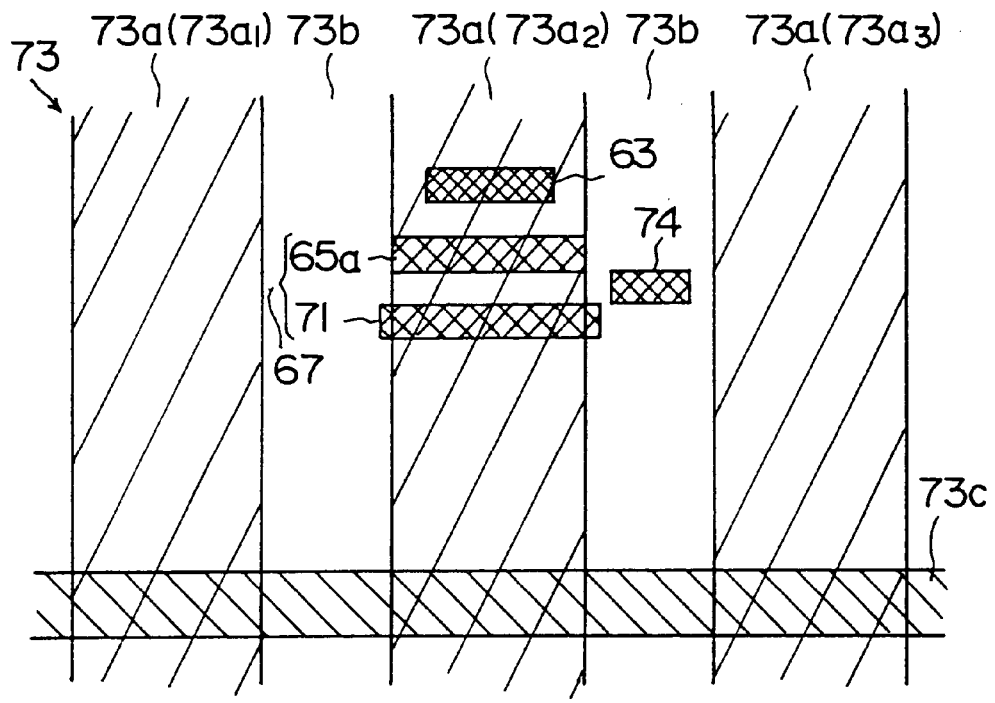
FIGS. 18A and 18B are schematic illustrations showing positions of each head element in tracks in the first embodiment of the present invention.
Figure 18B:
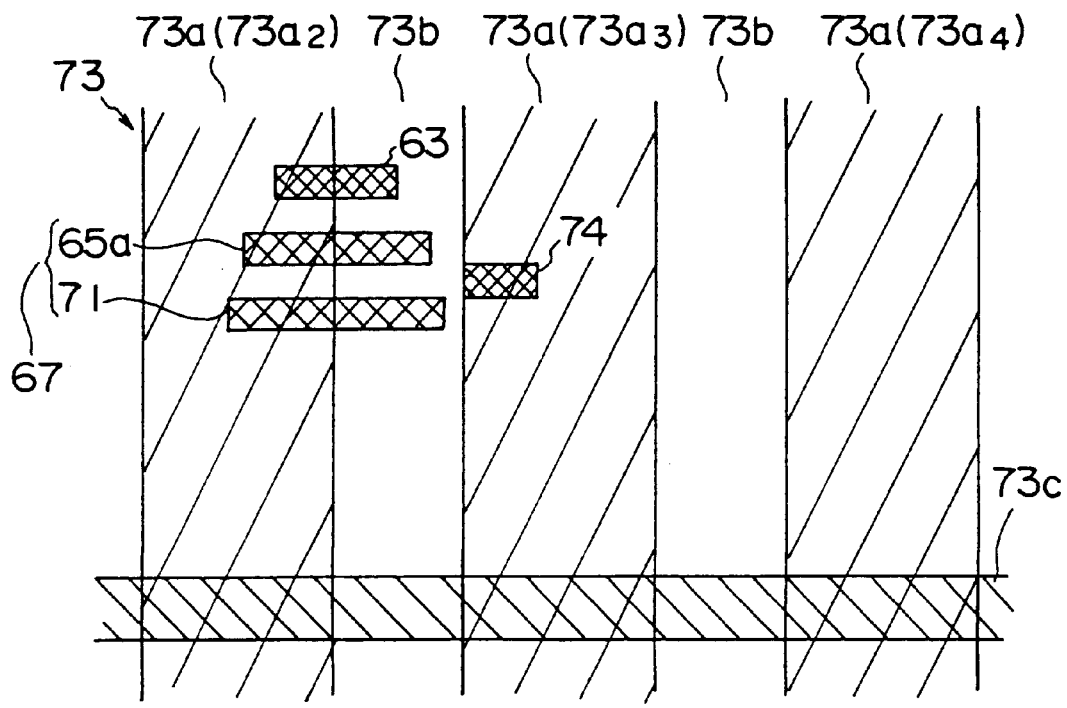

FIGS. 18A and 18B are schematic illustrations showing positions of the magnetic head 60 on the magnetic disc. Referring to FIGS. 16, 17, 18A and 18B, operations for detecting the off-tracking is described. In FIG. 18A, when the MR element 63 of the magnetic head 60 and the inductive head 67 are on a certain track 73a ($73a_2$) of the magnetic disc 73, the MR head element 74 is positioned over the track gap 73b and the vibration of the output signal thereof becomes minimum, as shown in FIG. 17.

When the output signal is input to the comparators 124, 125, the signal is not output from the NAND gate circuit 127 since the level of the output signal is lower than the standard signal. Therefore, the read/write operation is continued.

When a positioning error of the magnetic head 60 occurs due to the vibration or the impact, the MR element 63 and the inductive head 67 move to the track gap 73b and the MR head element for detection use 74 crosses the adjacent track 73a (73a₃), as shown in FIG. 18B. The read vibration thereof gradually increases, as shown in FIG. 17.

When the increased output signal from the MR head element for detection use 74 exceeds the level of the signal from the level slice circuit 126, the NAND gate circuit 127 sets the latch circuit 128 and the latch circuit 128 transmits the signal which indicates the off-tracking to the read/write controller 121 and the DSP 129. The level of the level slice circuit 126 can be determined responding to the head, a cylinder zone or medium zone by resetting it during a calibration. By this, an influence of the variation of the reproduction due to the difference of the speed between an outer track and an inner track and non-contrast between upper and lower zones can be avoided.

The read/write controller 121 closes the write gate or read gate to stop the write or the read operation. That is, when the write operation is conducted, the write operation stops at this time. Therefore, the data can be protected by preventing an overwriting of data of the adjacent track 73a₃ regardless of the YAW angle. Also, when the read operation is conducted, the read error can be prevented. Since the off-tracking is directly detected in this invention, a high performance can be expected. Further, since the off-tracking is detected by each magnetic head 60, an influence by the other magnetic heads 60 can be avoided.

In the above embodiment, the detection head element is realized by the MR element. However, the detection head element can be realized by an inductive head element of an electromagnetic conversion type.

A magnetic head in which a pair of or a plurality of MR elements are provided is disclosed in Japanese Laid-Open Patent Application No. 58-166526 and Japanese Laid-Open Patent Application No. 52-23925. Japanese Laid-Open Patent Application No. 58-166526 discloses a pair of MR elements arranged in parallel at an interval equivalent to a width of the track to detect a difference in resistance variation to detect the tracking error. In the present invention, the MR head element functions as a sensor detecting the vibration and the impact to detect the off-tracking.

The Japanese Laid-Open Patent Application No. 52-23925 discloses a plurality of MR elements electrically connected in series to perform a read function. In the present invention, which has a different object from the above disclosure, each MR element moves independently to detect the vibration and the impact.

Figure 19A:
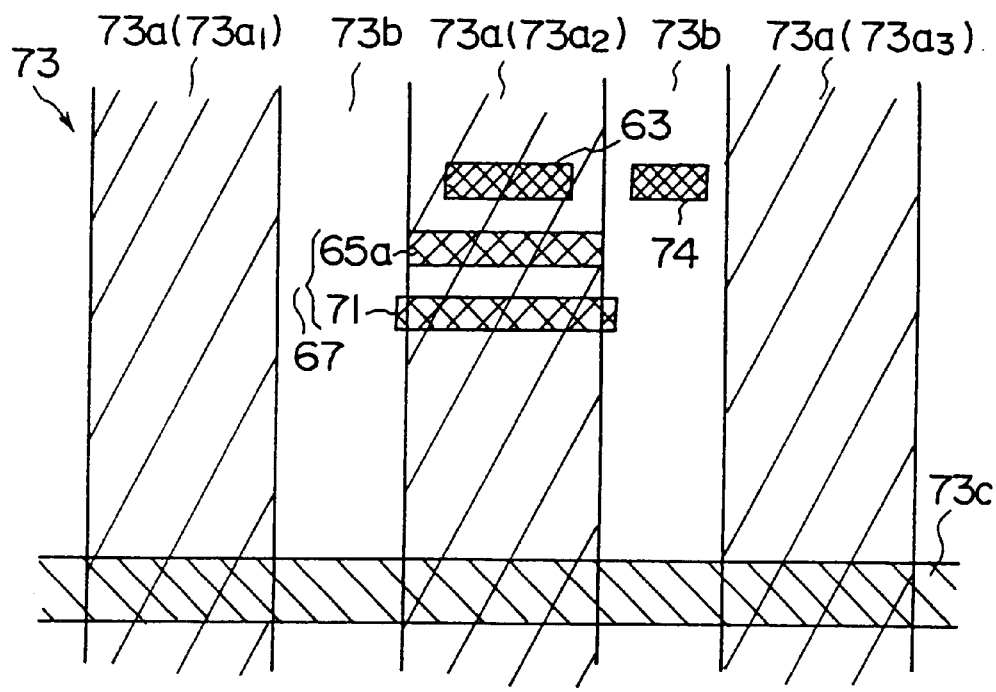
FIGS. 19A and 19B are schematic illustrations showing positions of each head element in tracks in a variation of the first embodiment of the present invention.
Figure 19B:
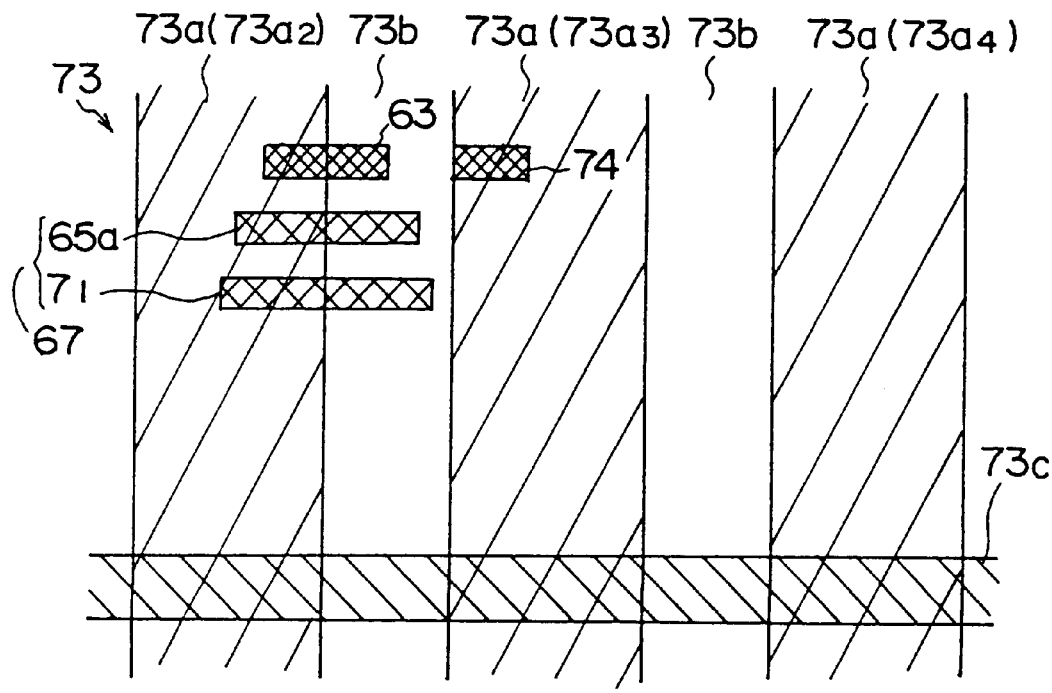

FIGS. 19A and 19B are schematic illustrations showing a variation of the first embodiment of the present invention. In FIG. 19A, when the MR head element for detection use 74 and the MR element 63 are approximately on the same line in track arrangement direction and the MR element 63 is on the track 73a (73a2), the MR head element for detection use 74 is designed to be on the track gap 73b. Other features are the same as those of the above embodiment.

When the MR element 63 and the inductive head 67 are on the track 73a (73a2), the MR head element for detection use 74 is on the dead zone 73b and the read vibration is minimum. When the off-tracking occurs due to the vibration or the impact, the MR head element for detection use 74 moves to track 73a (73a3) and the read vibration is increased to detect the off-tracking.

Even when the MR head element for detection use 74 and the MR element 63 are approximately on the same line, the off-tracking can be detected accurately. In this case, during a write operation, the MR head element for detection use 74 is affected by the YAW angle, however this can be handled by reducing a threshold or a slice level.

Figure 20A:
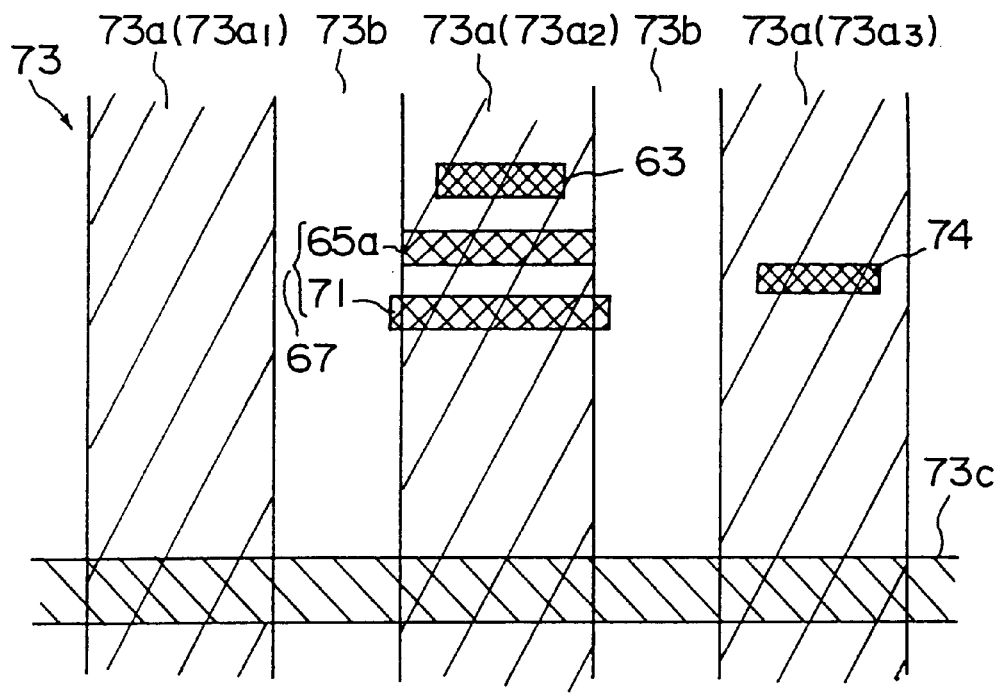
FIGS. 20A and 20B are schematic illustrations showing positions of each head element in tracks in a second embodiment of the present invention.
Figure 20B:
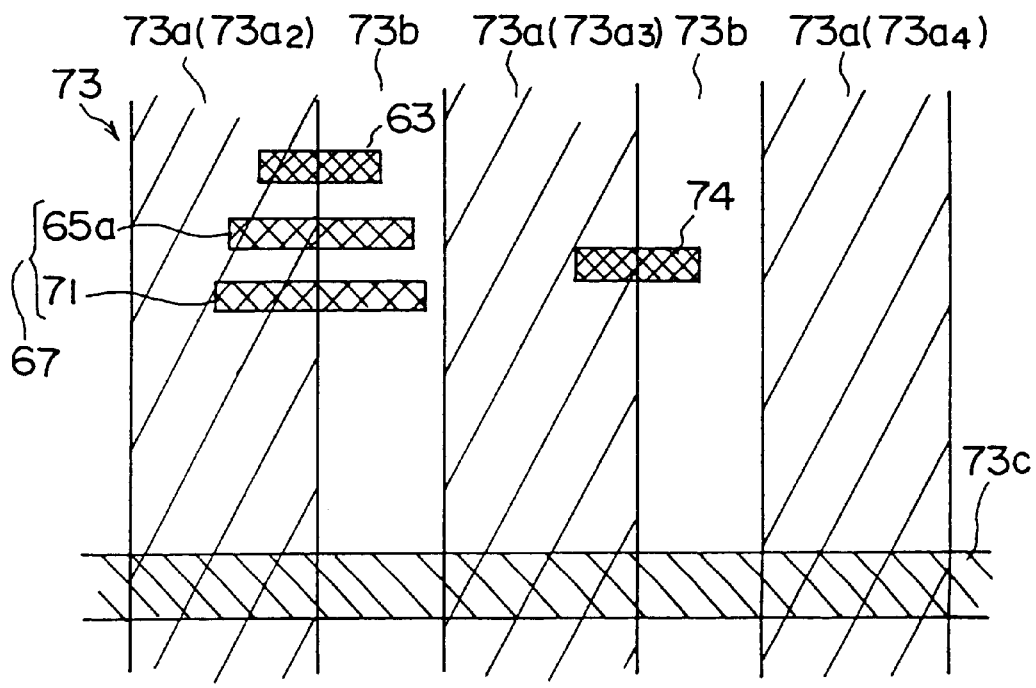

FIGS. 20A and 20B are schematic illustrations showing a second embodiment of the present invention. In FIG. 20A, the MR head element for detection use 74, which may be an electromagnetic conversion type, and the inductive head 67 are approximately on the same line in the track arrangement direction. Also, when the inductive head 67 and the MR element 63 are on the track 73a (73a₂), the MR head element for detection use 74 is designed to be on the track 73a (73a₃).

In this case, the MR head element for detection use 74 is arranged at one track pitch P from the core center of the inductive head 67 or a track center. If the space allows it, the MR head element for detection use 74 can be arranged at distance nP (n:integral number) from the core center of the inductive head 67 on another track. That is, for a decreased space of the dead zone and a convenience of the formation of the element layer, the inductive head 67 (MR element 63) can be positioned several tracks apart from the MR head element for detection use 74.

When the inductive head 67 and the MR element 63 are on the track 73a (73a₂), the output signal (read vibration) of the magnetic head element for detection use 74 is maximum, as shown in FIG. 17. When the inductive head 67 and MR element 63 start being off the track, they cross the track gap 73b, as shown in FIG. 20B, and the output signal (read vibration) gradually decreases. The off-tracking can be accurately detected by the decreased level.

In the second embodiment, an output state of the MR head element 74 is reversed from that of the first embodiment, the non-inverted output and the inverted output of the amplifier 123 are reversed and the signals therefrom can be sent to the comparators 124, 125.

Figure 21A:
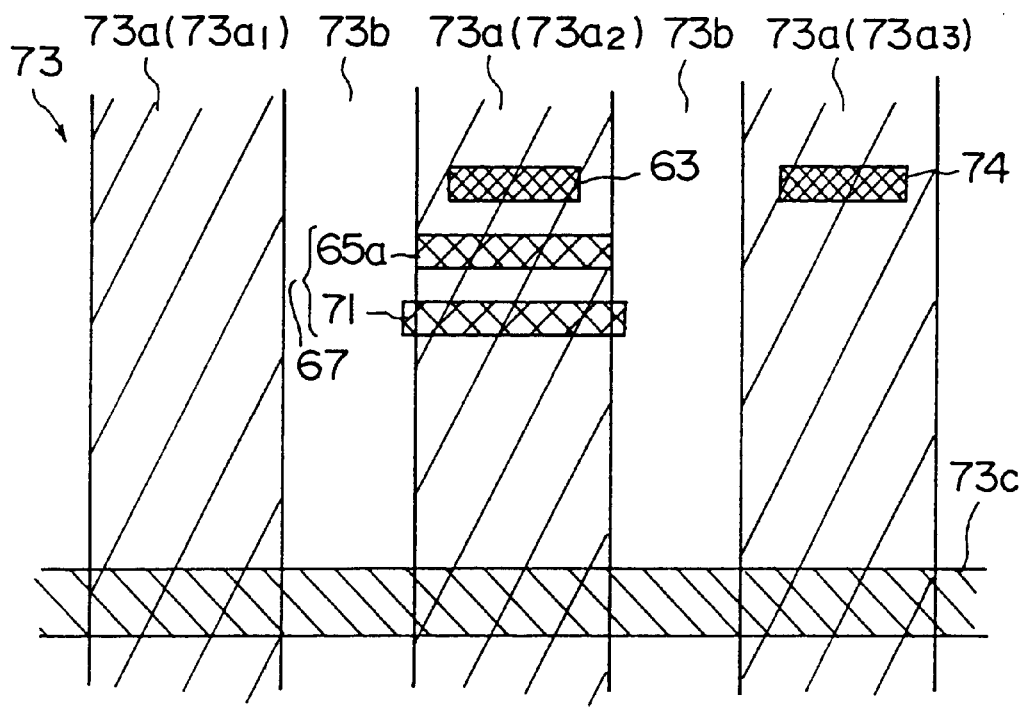
FIGS. 21A and 21B are schematic illustrations showing positions of each head element in tracks in a variation of the second embodiment of the present invention.
Figure 21B:
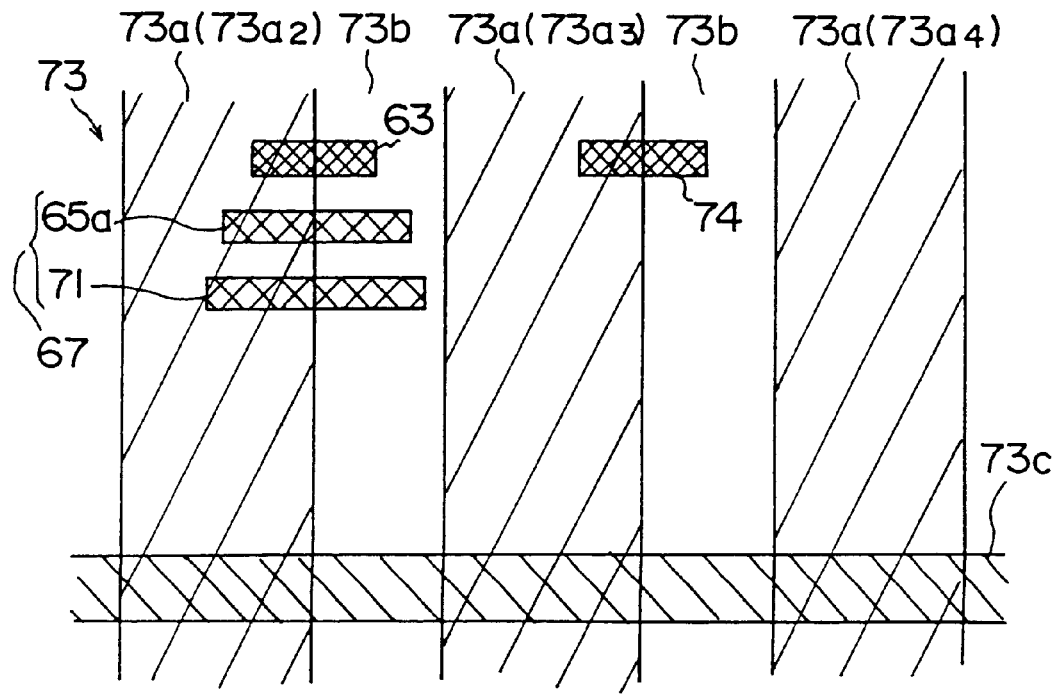

FIGS. 21A and 21B are schematic illustrations showing a modification of the second embodiment. In FIG. 21A, when the MR element 63 is on the track 73a (73a₂), the MR head element 74 and the MR element 63 are on the same line in the track arrangement direction, and the MR head element 74 is on the other track 73a (73a₃). Other features are the same as those described in FIGS. 20A and 20B.

When the MR element 63 and the inductive head 67 are on the track 73a (73a₂), the MR head element for detection use 74 is on the track 73a (73a₃) and the read vibration thereof is maximum. When the off-tracking occurs due to the vibration and impact, the MR head element for detection use 74 crosses the track 73a (73a₃) and the read vibration is reduced to detect the off-tracking.

As described above, when the MR head element for detection use 74 and the MR element 63 are on the same line, the off-tracking can be detected accurately. In this case, the MR head element for detection use 74 is influenced by the YAW angle, however this can be handled by reducing the threshold value of the detection of the off-tracking.

Further, the present invention is not limited to these embodiments, but various variations and modifications may be made without departing from the scope of the present invention.

What is claimed is:

1. A recording and reproducing device having a recording and reproducing head which records and reproduces data on a recording medium in which a plurality of tracks are arranged between track gaps in which no data is stored, said recording and reproducing head comprising;

a recording head element for recording data on said tracks of said recording medium;

a reproducing head element for reproducing data recorded on said tracks of said recording media; and a detection head element offset in a radial direction from said reproducing head such that when said reproducing head element is positioned over a selected one of said tracks, said detection head element is positioned over a track gap, said detection head being positioned at least partially over a selected one of said tracks when said reproducing head element is off-track, said detection head element detecting a positioning error of said recording and reproducing head when a signal reproduced by said detection head element exceeds a predetermined slice level.

2. The recording and reproducing device according to claim 1, wherein said detection head element is one of a magnetoresistance effect type and an electromagnetic conversion type.

3. The recording and reproducing device according to claim 1, wherein said detection head element and said recording head element are approximately aligned in a radial direction.

4. The recording and reproducing device according to claim 1, wherein said detection head element and said reproducing head element are approximately aligned in a radial direction.

5. The recording and reproducing device according to claim 1, further comprising off-tracking detecting means for detecting a positioning error in response to a variation of a reproduction output signal from said detection head element.

6. The recording and reproducing device according to claim 5, wherein said off-tracking detecting means has level slice means for storing a prescribed slice level, said level slice means comparing said prescribed slice level with the reproduction output signal from said detection head element in order to detect said off-tracking of each of said recording head element and said reproducing head element.

7. The recording and reproducing device according to claim 6, wherein said level slice means renews said prescribed slice level during a calibration.

8. The recording and reproducing device according to claim 6, wherein said level slice means stores said prescribed slice level for each of said heads.

9. The recording and reproducing device according to claim 6, wherein said level slice means stores said prescribed slice level for each of said track gaps in said recording medium.

10. A recording and reproducing head for recording and reproducing data on a recording medium having plural tracks for storing user data and gaps in which no data is stored between each of said plural tracks, said head comprising;

a slider rail;

a recording head element for recording data on a track of said recording medium;

a reproducing head element for reproducing data recorded on a track of said recording medium; and a detection head element for detecting a positioning error of each of said recording head element and said reproducing head element, said detection head element being offset in a radial direction from one of said recording head element and said reproducing head element such that said detection head element is positioned over a selected one of said gaps immediately adjacent a selected track over which said recording head element is positioned, wherein said recording head element, said reproducing head element and said detection head element are provided on said slider rail.

11. The recording and reproducing head according to claim 10, wherein said detection head element and said recording head element are approximately on the same line so that said detection head element is positioned above a certain area of said recording medium which is different from that over which said recording head element is positioned.

12. The recording and reproducing head according to claim 10, wherein said detection head element and said reproducing head element are approximately aligned so that said detection head element is positioned over a certain area of said recording medium which is different from that over which said reproducing head element is positioned.

13. A recording and reproducing device having a recording and reproducing head which records and reproduces data on a recording medium in which a plurality of tracks are arranged between track gaps in which no data is stored, said recording and reproducing head comprising:

a recording head element for recording data on said tracks of said recording medium;

a reproducing head element for reproducing data recorded on said tracks of said recording media; and a detection head element offset in a radial direction from said reproducing head so as to reproduce data stored in an area of the recording medium which is different from that over which said reproducing head is positioned, for detecting a positioning error of said recording and reproducing head according to a level of a detected reproducing signal, said detection head element being substantially over one of said track gaps when said recording head element is substantially positioned over one of said tracks, wherein said detection head element checks for an off-tracking condition of said recording head element and said reproducing head element only when said recording head element records data.

* * * * *